US006294114B1

(12) United States Patent
Muirhead

(10) Patent No.: US 6,294,114 B1
(45) Date of Patent: Sep. 25, 2001

(54) TRIPLE SHEET THERMOFORMING APPARATUS, METHODS AND ARTICLES

(76) Inventor: Scott A. W. Muirhead, R.R. 3, Box 7128, Uniontown, PA (US) 15401

( * ) Notice: Subject to any disclaimer, the term of this patent is extended or adjusted under 35 U.S.C. 154(b) by 0 days.

(21) Appl. No.: 09/377,792

(22) Filed: Aug. 20, 1999

Related U.S. Application Data

(60) Provisional application No. 60/097,200, filed on Aug. 20, 1998.

(51) Int. Cl.[7] .......................... B29C 51/10; B29C 51/14; B29C 51/42; B29C 51/46
(52) U.S. Cl. ......................... 264/40.6; 156/292; 264/545
(58) Field of Search .................................. 264/40.6, 545; 156/292

(56) References Cited

U.S. PATENT DOCUMENTS

| | | |
|---|---|---|
| 3,398,434 | 8/1968 | Alesi, Jr. et al. . |
| 3,583,036 | 6/1971 | Brown . |
| 3,597,799 | 8/1971 | Earle . |
| 3,695,188 | 10/1972 | Granatstein . |
| 3,702,100 | 11/1972 | Wharton . |
| 3,779,687 | 12/1973 | Alesi . |
| 3,783,078 | 1/1974 | Brodhead . |
| 3,787,158 | 1/1974 | Brown et al. . |
| 3,867,088 | 2/1975 | Brown et al. . |
| 3,868,209 | 2/1975 | Howell . |
| 3,919,382 | 11/1975 | Smarook . |
| 3,919,445 | 11/1975 | Smarook . |
| 3,919,446 | 11/1975 | Smarook . |
| 3,925,140 | 12/1975 | Brown . |
| 3,964,400 | 6/1976 | Brand . |
| 4,013,021 | 3/1977 | Steinlein et al. . |
| 4,070,839 | 1/1978 | Clem . |
| 4,079,232 | 3/1978 | Brokoff et al. . |
| 4,101,252 | 7/1978 | Brown . |
| 4,113,909 | 9/1978 | Bealsey . |
| 4,133,270 | 1/1979 | Ravera . |
| 4,158,539 | 6/1979 | Arends et al. . |
| 4,164,387 | 8/1979 | Schermutzki et al. . |
| 4,164,389 | 8/1979 | Beasley . |
| 4,194,663 | 3/1980 | West et al. . |
| 4,244,915 | 1/1981 | Boardman . |
| 4,255,382 | 3/1981 | Arends et al. . |
| 4,287,836 | 9/1981 | Aoki . |
| 4,348,442 | 9/1982 | Figge . |
| 4,377,377 | 3/1983 | Arends et al. . |
| 4,428,306 | 1/1984 | Dresen et al. . |
| 4,464,329 | 8/1984 | Whiteside et al. . |
| 4,488,496 | 12/1984 | Polacco . |
| 4,507,348 | 3/1985 | Nagata et al. . |
| 4,509,432 | 4/1985 | Win . |
| 4,509,909 | 4/1985 | Arends . |
| 4,513,048 | 4/1985 | Kaube et al. . |
| 4,531,901 | 7/1985 | Andersen . |
| 4,555,377 | 11/1985 | Whiteside et al. . |
| 4,555,381 | 11/1985 | Chazal et al. . |
| 4,600,376 | 7/1986 | Gillman et al. . |
| 4,606,278 | 8/1986 | Shuert . |
| 4,608,009 | 8/1986 | Whiteside et al. . |
| 4,636,348 | 1/1987 | Whiteside . |
| 4,649,007 | 3/1987 | Bonis et al. . |
| 4,666,544 | 5/1987 | Whiteside et al. . |
| 4,742,781 | 5/1988 | Shuert . |
| 4,801,347 | * 1/1989 | Garwood .......................... 156/292 X |
| 4,846,077 | 7/1989 | Win . |
| 4,879,956 | 11/1989 | Shuert . |
| 4,907,515 | 3/1990 | Win . |
| 4,969,812 | 11/1990 | Brown . |
| 5,007,225 | 4/1991 | Teasdale . |
| 5,030,501 | 7/1991 | Colvin et al. . |
| 5,042,396 | 8/1991 | Shuert . |
| 5,046,434 | 9/1991 | Breezer et al. . |
| 5,071,603 | 12/1991 | Kurumaji et al. . |
| 5,088,418 | 2/1992 | Reckermann et al. . |
| 5,108,529 | 4/1992 | Shuert . |
| 5,117,762 | 6/1992 | Shuert . |
| 5,123,359 | 6/1992 | DelBalso . |
| 5,123,541 | 6/1992 | Giannini et al. . |
| 5,143,778 | 9/1992 | Shuert . |
| 5,156,782 | 10/1992 | Ballantyne . |
| 5,164,211 | 11/1992 | Comer . |
| 5,167,969 | 12/1992 | DeMaio, Jr. et al. . |
| 5,168,817 | 12/1992 | Nulle et al. . |
| 5,197,395 | 3/1993 | Pigott et al. . |
| 5,197,396 | 3/1993 | Breezer et al. . |
| 5,225,213 | 7/1993 | Brown et al. . |
| 5,226,373 | 7/1993 | Esch . |

(List continued on next page.)

FOREIGN PATENT DOCUMENTS

WO 99/64221   12/1999   (WO) .

OTHER PUBLICATIONS

Cleveland Consulting Associates, Recommendations on the Grocery Industry Pallet System, 1989. Grocery Manufacturers of America, Inc., Washington, D.C.

Clyde E. Witt, Guide Line for Plastic Pallets, Material Handling Engineering, Sep. 1998, p. 22.

Clyde E. Witt, What You Need to Know About Plastic Pallets, Material Handling Engeering, Sep. 1998 pp. 57–63.

Peter Mapleston, Plastics Set to take a Share of Market for Wood Pallets, Jul. 1998, pp. 68–73.

Advertisement, Molding the Future, Menasha Corporation, Material Handling Engineering, Sep. 1998.

*Primary Examiner*—Leo B. Tentoni
(74) *Attorney, Agent, or Firm*—Harness, Dickey & Pierce, P.L.C.

(57) ABSTRACT

A method of manufacturing a thermoplastic article including heating first and second thermoplastic sheets and conforming the first and second thermoplastic sheets to corresponding molds. The first and second thermoplastic are then joined to form a sheet subassembly. The method further includes heating a third thermoplastic sheet and conforming the third thermoplastic sheet to a corresponding mold. The third thermoplastic sheet is then joined to the sheet subassembly.

18 Claims, 13 Drawing Sheets

U.S. PATENT DOCUMENTS

| | | |
|---|---|---|
| 5,255,613 | 10/1993 | Shuert . |
| 5,283,028 | 2/1994 | Breezer et al. . |
| 5,283,029 | 2/1994 | Ellemor . |
| 5,329,861 | 7/1994 | Mccarthy . |
| 5,329,862 | 7/1994 | Breezer et al. . |
| 5,337,681 | 8/1994 | Schrage . |
| 5,351,627 | 10/1994 | Junaedi . |
| 5,351,628 | 10/1994 | Breezer et al. . |
| 5,351,629 | 10/1994 | Breezer et al. . |
| 5,367,960 | 11/1994 | Schleicher . |
| 5,367,961 | 11/1994 | Arai et al. . |
| 5,390,467 | 2/1995 | Shuert . |
| 5,391,251 | 2/1995 | Shuert . |
| 5,401,347 | 3/1995 | Shuert . |
| 5,402,735 | 4/1995 | DeJean . |
| 5,404,829 | 4/1995 | Shuert . |
| 5,407,632 | 4/1995 | Constantino et al. . |
| 5,408,937 | 4/1995 | Knight, IV et al. . |
| 5,413,052 | 5/1995 | Breezer et al. . |
| 5,427,732 | 6/1995 | Shuert . |
| 5,470,641 | 11/1995 | Shuert . |
| 5,492,069 | 2/1996 | Alexander et al. . |
| 5,505,141 | 4/1996 | Barber . |
| 5,527,585 | 6/1996 | Needham et al. . |
| 5,531,585 | 7/1996 | Lupke . |
| 5,535,668 | 7/1996 | Besaw et al. . |
| 5,549,056 | 8/1996 | Jordan et al. . |
| 5,555,820 | 9/1996 | Shuert . |
| 5,566,624 | 10/1996 | Brown et al. . |
| 5,596,933 | 1/1997 | Knight et al. . |
| 5,606,921 | 3/1997 | Elder et al. . |
| 5,620,715 | 4/1997 | Hart et al. . |
| 5,624,622 | 4/1997 | Boyce et al. . |
| 5,624,630 | 4/1997 | Breezer et al. . |
| 5,635,129 | 6/1997 | Breezer et al. . |
| 5,635,306 | 6/1997 | Minamida et al. . |
| 5,638,760 | 6/1997 | Jordan et al. . |
| 5,658,523 | 8/1997 | Shuert . |
| 5,676,064 | 10/1997 | Shuert . |
| 5,687,652 | 11/1997 | Ruma . |
| 5,716,581 | 2/1998 | Tirrell et al. . |
| 5,755,162 | 5/1998 | Knight et al. . |
| 5,758,855 | 6/1998 | Jordan et al. . |
| 5,769,003 | 6/1998 | Rose et al. . |
| 5,778,801 | 7/1998 | Delacour . |
| 5,782,129 | 7/1998 | Vanderzee et al. . |
| 5,791,262 | 8/1998 | Knight et al. . |
| 5,794,542 | 8/1998 | Besaw . |
| 5,794,544 | 8/1998 | Shuert . |
| 5,800,846 | 9/1998 | Hart . |
| 5,813,355 | 9/1998 | Brown et al. . |
| 5,814,185 | 9/1998 | Chun et al. . |
| 5,830,299 | 11/1998 | Casanovas et al. . |
| 5,836,255 | 11/1998 | Uitz . |
| 5,843,366 | 12/1998 | Shuert . |
| 5,845,588 | 12/1998 | Gronnevik . |
| 5,860,369 | 1/1999 | John et al. . |
| 5,862,760 | 1/1999 | Kohlhaas . |
| 5,868,080 | 2/1999 | Wyler et al. . |
| 5,879,495 | 3/1999 | Evans . |
| 5,885,691 | 3/1999 | Breezer et al. . |
| 5,894,803 | 4/1999 | Kuga . |
| 5,900,203 | 5/1999 | Needham et al. . |
| 5,921,189 | 7/1999 | Estepp . |
| 5,950,545 | 9/1999 | Shuert . |
| 5,950,546 | 9/1999 | Brown et al. . |
| 5,967,057 | 10/1999 | Nakayama et al. . |
| 5,975,879 | 11/1999 | Dresen et al. . |
| 5,980,231 | 11/1999 | Arends et al. . |
| 5,993,724 | 11/1999 | Shuert . |
| 6,006,677 | 12/1999 | Apps et al. . |
| 6,018,927 | 2/2000 | Major . |
| 6,021,721 | 2/2000 | Rushton . |
| 6,029,583 | 2/2000 | LeTrudet . |
| 6,199,488 | 3/2001 | Favaron et al. . |

* cited by examiner

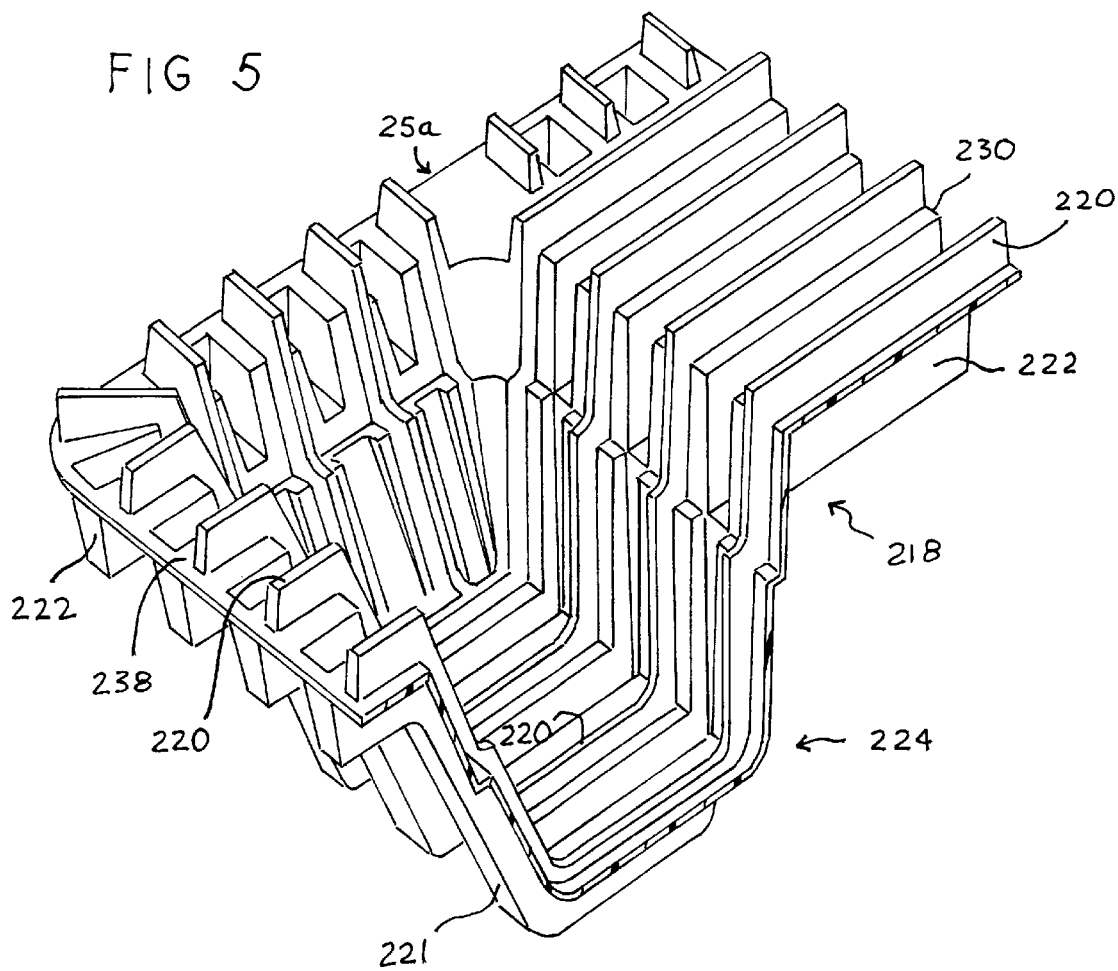

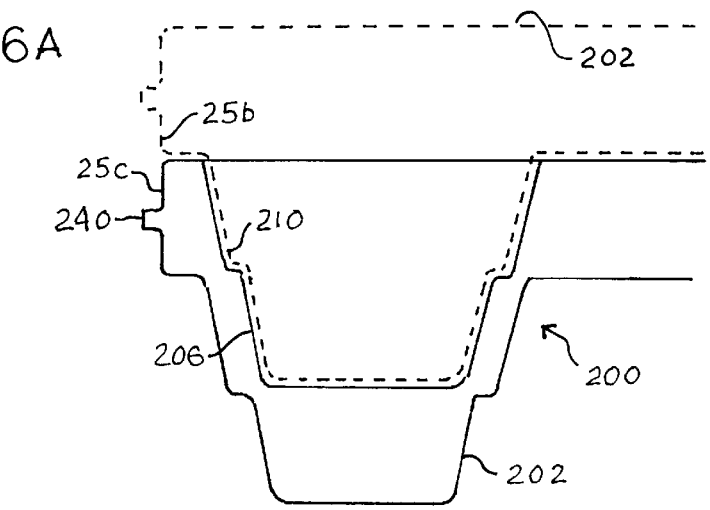
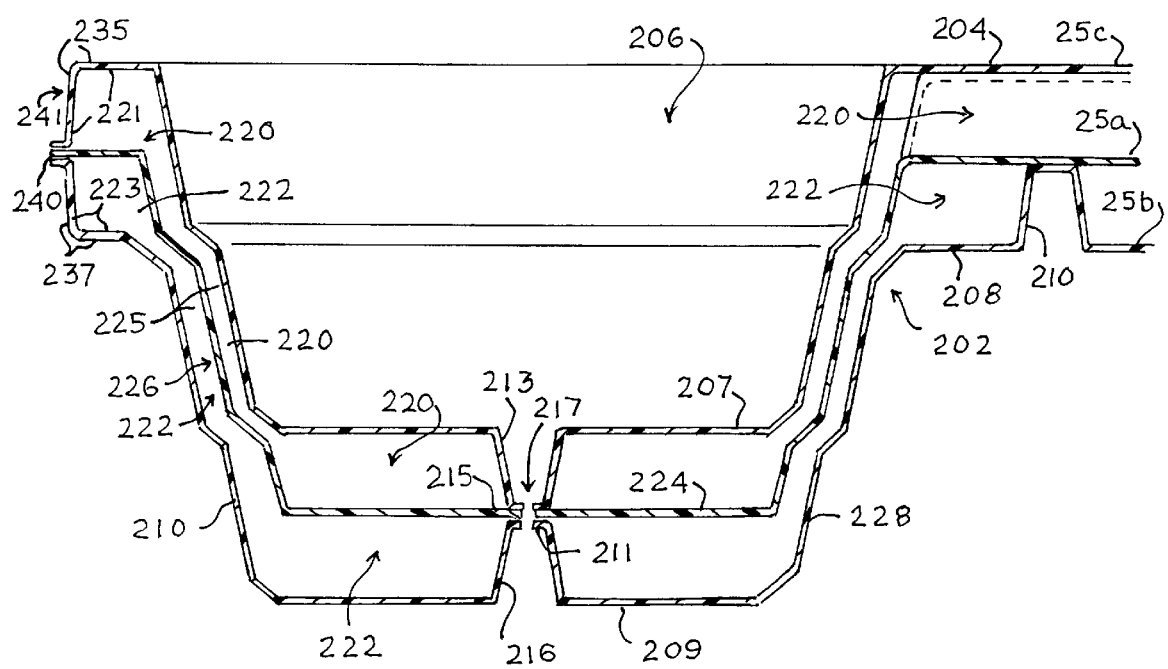

TRIPLE SHEET THERMOFORMING APPARATUS, METHODS AND ARTICLES

CROSS-REFERENCE TO RELATED APPLICATION

This application claims the benefit of U.S. Provisional Application No. 60/097,200, filed Aug. 20, 1998.

TECHNICAL FIELD

The present inventions relate to thermoforming apparatus, methods and articles in general and, in particular, to thermoplastic articles constructed of three thermoplastic sheets formed by triple sheet thermoforming apparatus and methods.

DESCRIPTION OF THE PRIOR ART

The art of twin sheet thermoforming is well known and has been practiced extensively in recent years in the construction of plastic articles. The basic apparatus and principles of twin sheet thermoforming are well known and are provided by way of example in U.S. Pat. Nos. 3,583,036, 3,787,158 and 3,925,140 to Brown. The intended purpose of twin sheet thermoforming is to produce articles having greater strength than similar articles formed from a single sheet of thermoplastic.

Among articles thermoformed using the twin sheet methodology are plastic pallets which are constructed out of two thermoplastic sheets. An early example of a pallet formed in this general character is disclosed in U.S. Pat. No. 4,428,306 to Dresen et al. Twin sheet pallets of the type referenced in U.S. Class 108/53.3 are known in the field as nesting pallets.

The art of twin sheet thermoforming extends to yet another type of plastic pallet referred to as a racking pallet. A racking pallet is designed to support a load between the two parallel beams of warehouse storage racks. Examples of rackable plastic pallets are disclosed in U.S. Pat. Nos. 5,117,762 to Shuert, and 5,197,396 to Breezer et al. As is widely understood in the field, racking pallets formed by thermoforming methods and constructed out of high density polyethylene (HDPE) thermoplastics exhibit a high degree of creep, such that over time and under loaded conditions, the racking pallet deflects and eventually fails. Accordingly, it is common practice to reinforce racking pallets with rigid non-thermoplastic cross-members interposed between the twin sheets forming the structures of the pallet.

Twin sheet thermoplastic pallets of the nesting and racking variety have been employed with some degree of success. The problems associated with traditional pallets formed of wood have been largely overcome with the use of thermoplastic pallets formed by thermoforming methods. There are problems however associated with twin sheet thermoformed plastic pallets. A common problem with twin sheet nesting pallets is that a network of stiffening recesses are molded into the top surface to increase flexural strength as well as to provide fusion points connecting the top sheet to the underlying sheet of the molded plastic pallet. Recesses are disadvantageous because they reduce the surface area available for supporting loads upon the pallet. Recesses also capture debris and liquid that may damage or contaminate goods transported upon the surface of the pallet. Another common problem with many twin sheet pallets is that they are not easily recycled because they contain rigid non-plastic cross-members, or equivalent structures, which are used to add strength. These rigid non-plastic structures have to be removed and separated before the thermoplastic used to construct the pallet can be recycled and reused. Another problem with twin sheet racking pallets of the type disclosed in the prior art is that mechanical fasteners are required in practice to join and maintain an upper load bearing pallet structure to a lower load supporting pallet structure in spaced parallel relation. Mechanical fasteners are costly and require special care and attention to both maintain the working life of the plastic pallet and to provide for the recycling and reuse of the thermoplastic used to form the pallet. The double deck plastic pallet disclosed in U.S. Pat. No. 5,197,396 to Penda Corporation is hereby provided as an example to describe the problems characteristic of twin sheet pallets.

A considerable number of proposals have been offered by Shuert in U.S. Pat. Nos. 5,404,829, 5,391,251, 5,255,613, Continuations-in-part of Ser. No. 993,762, Dec. 18, 1992, U.S Pat. No 5,401,347, and Continuation-in-part of Ser. No. 636,062, Apr. 22, 1996, U.S. Pat. No. 5,676,064, to over come problems associated with twin sheet pallets and in particular with mechanical fasteners. In summary, Shuert proposes "fusion" as a means of joining the various pallet structures referenced in the detailed descriptions of his pallet inventions. However, Shuert does not teach how a plurality of separate thermoplastic pallet structures can be fused together in substitution of mechanical fasteners. Thus, Shuert does not adequately disclose how two or more twin and single sheet components can be fused together to produce a resilient and durable stacking pallet structure.

The traditional 48 inch×40 inch "GMA" wood pallet remains an integral part of America's grocery distribution system today, and is involved in one way or another in the movement of over 90% of all dry goods. It is estimated that the current inventory of wood pallets costs the grocery industry nearly $2 billion annually, almost half of which is determined to be the result of product damage, carrier inefficiencies, productivity losses, and time allocated to sort and repair wood pallets. Although twin sheet thermoformed pallets of the type characteristic in the prior art have been used to some advantage in recent years, they do not yet comply with the set of standard pallet-design specifications that would reduce the costs associated with pallet exchange systems used within the grocery industry. While thermoformed plastic pallets are attractive for durability and ease of sanitation, they still have several shortcomings. Most notably, current thermoformed pallets deform under heavy load and unless reinforced with steel, wood or the like, do not provide acceptable racking strength. Conventionally reinforced thermoformed pallets are therefore costly and less susceptible to recycling. Accordingly, the art must be advanced significantly before thermoformed plastic pallets will enjoy wide acceptance within the many sectors of the material handling industry.

Another application of twin sheet thermoforming is found in the area of thermoplastic dumpster lids. Double walled thermoplastic dumpster lids produced by the twin sheet thermoforming method have been used to replace metal dumpster lids with some success. Thermoplastic dumpster lids have the advantages of being low cost, light weight, quiet, rust proof and relatively dent resistant. Thermoplastic dumpster lids thermoformed of PE materials however have some problems. PE twin sheet dumpster lids undergo significant wear, tear and abuse during regular use. Opening and closing the lid over an extended period of time causes hinge points formed in the dumpster lid to weaken and develop stress cracks which radiate into the main body of the lid, thus causing failure and in some cases danger to children playing upon the dumpster. Therefore, the art still requires further advancement to overcome strength related problems.

Many other small and large articles thermoformed according to the twin sheet methodology are found in a wide variety of primary end markets including recreational and sporting goods, building and construction, automotive and transportation, marine, agricultural, appliance, industrial and consumer products to name a few. Substantially all articles thermoformed according to the twin sheet methodology have either greater strength than similar articles formed from a single sheet of thermoplastic; they provide greater cost efficiencies in the manner in which they are produced and reinforced to replace an existing product of the similar application; or, they offer improved quality as a result of parts consolidation and ease of manufacture.

Although the art of twin sheet thermoforming has resulted in improved products in a wide variety of applications and end markets, a range of needs nonetheless exists to advance thermoforming methods and apparatus to overcome such specific weaknesses as have been mentioned above, or generally, to further increase the strength, lower the costs or improve the quality of articles constructed of thermoplastic materials.

SUMMARY OF THE INVENTIONS

These inventions are directed toward advancements in thermoforming apparatus and methods and thermoformed articles. More specifically, these original inventions propose the innovations of triple sheet thermoforming apparatus and methods to produce novel triple sheet articles that overcome twin sheet product weaknesses, or in articles that achieve unique objectives and provide original advantages.

This specification therefore summarizes three fields of invention. A first field of invention describes the apparatus of triple sheet thermoforming machinery. A second field of invention describes the methods of triple sheet thermoforming. A third field of invention describes four articles that may be made according to the apparatus and the methods of triple sheet thermoforming.

THE APPARATUS OF TRIPLE SHEET THERMOFORMING

The first invention generally relates to twin sheet thermoforming machinery and in particular to apparatus that advances the art from twin to triple sheet thermoforming.

As is well known in the art twin sheet thermoforming, twin sheet thermoforming machinery includes four workstations and a wheel with four clamp frames. The wheel rotates about an axis located centrally, with the four stations located in four quadrants equivalent to the 12 o'clock, 3 o'clock, 6 o'clock and 9 o'clock positions. The wheel is likewise configured into four quadrants such that the four frames of the wheel register vertically in spaced parallel relation with the four station quadrants. Station 1, generally at the 6 o'clock position, in a twin sheet thermoforming machine, is arranged to load sheet into the four frames and to remove twin sheet articles from the second and fourth of four frames. Station 2, generally at the 9 o'clock position, includes a first upper and a first lower pre-heat bank of infrared emitters, which heat a sheet 1 loaded into the frame 1 of the wheel. Station 3, generally at the 12 o'clock position, includes a second upper and lower bank of infrared emitters, which continue to heat sheet 1 as the wheel is indexed forward carrying sheet 2 loaded into the frame 2 from station 1 to station 2. Station 4, generally at the 3 o'clock position, includes first lower and second upper platens holding a first lower mold and a second upper mold. Sheet 4 is loaded into frame 4, sheet 3 is indexed forward to station 2, sheet 2 to station 3, sheet 1 to station 4, where lower platen extends upward and heated sheet 1 is thermoformed by known manner over the lower mold held upon the lower platen. After sheet 1 is thermoformed over the lower mold, frame 1 opens from the bottom and releases sheet 1, and the lower platen retracts with sheet 1 held under vacuum over the lower mold. The wheel indexes forward carrying sheet 2 to station 4, sheet 3 to station 3 and sheet 4 to station 2. While a sheet 5 is loaded into station 1, the upper platen of station 4 extends downward and sheet 2 is thermoformed over a second upper mold by known manner. After sheet 2 is thermoformed over second upper mold, and while second upper platen is maintained in an extended position at the sheet line, the lower platen extends upward carrying thermoformed sheet 1 upon first lower mold to sheet 2 upon second upper mold. When both platens are extended they are interlocked by in known manner and sheets 1 and 2 are selectively fused together at predetermined knitting points as the lower mold and the upper mold are compressed by the further upward extension of first lower platen. After heated thermoformed sheets 1 and 2 have been fused together in known manner, the lower and upper platens and molds retract leaving the twin sheet article in frame 2. After a period of delay, during which time the twin sheet article is cooled by means well understood, and sheets 3 and 4 are heated to thermoforming temperatures, the wheel is indexed forward. The first twin sheet article is then unloaded at station 1, and a sheet 6 is loaded into frame 2 at station 1. Sheet 5 is indexed to station 2, sheet 4 is indexed to station 3, and sheet 3 is indexed to station 4, wherein the twin sheet thermoforming process is repeated in continuous phase.

Accordingly, an object of the present invention is to increase the heating capacity of a thermoforming machine by providing for the heating of three successive sheets. The object is accomplished with unique arrangement of a third heater station upon a four station thermoforming machine. Apparatus including a fifth bank of infrared emitters is uniquely provided at the load/unload station above the wheel so that in the novel triple sheet thermoforming machine three thermoplastic sheets can be successively loaded into the machine and heated within three ovens.

Another object of the invention is to provide five heater banks that can be selectively calibrated and controlled according to the heat absorption characteristics of the thermoplastic sheet specified for the triple sheet article. Therefore, a unique feature of the present invention is to provide heaters with controls suitable for triple sheet thermoforming. Heat can be transferred in three ways, namely conduction, convection or radiation. Infrared heat is one form of radiation that happens to best match the absorption characteristics of most thermoplastics. There are many options for radiating infrared heat. Some of the most common of these are electric heaters including calrods™, ceramic elements, panel heaters and quartz tubes. Quartz tubes are the industry standard when fast response is required. Quartz tube heaters can be quickly adjusted to match the requirements of different sheet thickness and oven duration times. Electric heaters used in the triple sheet thermoforming operations should provide at least 15 watts per square inch (wsi) on each of the top and bottom oven banks, for a minimum machine total of 75 wsi. To facilitate more responsive heating, ceramic elements can be spaced to provide 30 wsi, or quartz tubes with a maximum 60 wsi can be used for each of the 5 oven banks, for a total of 300 wsi. Power switching devices such as solid state relays or silicon controlled rectifiers are preferred and are controlled by either PLCs or computer bases systems so that emitter profile sequence recipes for all heaters can be adjusted and repeated in phase with triple sheet thermoforming processes. Additionally, infrared sensors are used to control heater temperatures where conditions warrant response to variation. Accordingly, it is an objective of the present invention to provide 3 top and 2 bottom heat sources having a minimum density of 15 wsi, and PLC controlled closed loop control systems facilitating multivariate oven zone and heater profile control from cycle to cycle.

Another object of the invention are controls suitable for emitting higher or lower heat profiles from one frame carrying thicker sheet to a next frame carrying thinner sheet. Triple sheet thermoforming apparatus features rapid response heaters and heater control so that the triple sheet article to be thermoformed according to the triple sheet methodology to be constructed out of different thermoplastic sheets and in combinations which optimize the strength to weight to cost ratios of the article being constructed.

Another object of the invention proposed herein is apparatus for moving the first upper bank of heaters from a position close to the sheet line to a position away from the sheet line. This novel object prevents articles rotating from the form station from crashing into elements of the heating apparatus above the wheel at the first load/unload station.

It is yet another object of the present invention to provide for the addition of a third thermoforming mold upon which a third thermoplastic sheet is molded to form a triple sheet article. This object is accomplished with a slide assembly upon which two molds are releasably secured. The slide assembly cooperates with the vertically movable upper platen and elements of it move laterally in a first direction to position a first upper mold into vertical alignment above a first sheet, and laterally in a second direction to position a second upper mold into vertical alignment above a third sheet. It will be seen in the detailed description of the present invention, that interposed between the molding of the first and third sheets is the molding of a second sheet upon a first lower mold found upon the lower vertically movable platen. The slide assembly is operated to facilitate a basic characteristic of the innovative triple sheet methodology.

Another object of the present invented apparatus is the provision of co-engaging, pivotally opposed pin bars mounted to co-acting solenoid operated cylinders that open from the top and the bottom. Twin sheet clamp frames open from the bottom. This arrangement is used so that a first sheet thermoformed over a mold mounted to the lower platen can be released from the first frame and lowered away from the sheet line where a second sheet traverses into the form station and is thermoformed over a second mold mounted upon the upper platen. In the triple sheet methodology, it is necessary to extract at least one molded sheet away from and above the sheet line while another sheet is being molded upon a mold affixed to an opposed platen. Therefore, another feature of the present invention is a novel clamp frame apparatus that opens from the top and the bottom to facilitate an unanticipated characteristic of triple sheet thermoforming.

Another object of the invented triple sheet clamp frames is the manner in which they are controlled in the triple sheet thermoforming process. As is well understood in the twin sheet methodology, the single action solenoid operated cylinders open after the first sheet is molded and remain closed after the second sheet is molded. This sequence is repeated in phase in the twin sheet methodology, and requires relatively simple process control. The triple sheet methodology is substantially more complicated. In one preferred embodiment of the present invention, the first, second and third frames of the first complete part production cycle follow opened, opened and closed instructions, respectively. In the second part production cycle, the fourth, first and second frames respond to opened, opened and closed instructions. Following this logic, it is seen that all of the clamp frame assemblies of the present invention thermoforming apparatus must be able to respond to either opened or closed instructions in phase with the triple sheet methodology proposed. Accordingly, another feature of the invention is novel triple sheet clamp frame controls that are provided to instruct the clamp apparatus to open or remain closed in phase with the triple sheet thermoforming process.

Still yet another feature of the present invention apparatus is means of platen control which is enabling to retract and extend setting of the upper and lower platens to vary in vertical elevation according to the tooling and triple sheet methodology used to thermoform the triple sheet articles proposed. As is understood in the practice of twin sheet operations, upper and lower platen retract and extend positions are sequenced in phase according to the forming and fusing of two sheet members. This is a relatively simple matter. The requirements of the triple sheet thermoforming methodology are considerably more complicated. An apparatus is proposed herein for vertically adjusting the upper and lower platen positions relative to each other and in phase with the forming of three thermoplastic sheets over three thermoforming molds. Accordingly, it will be seen that the apparatus disclosed includes means and controls that enable the platens to extend and retract to different vertical positions depending upon the relative distances that the molding surfaces of the molds affixed to the slide structures residing upon the platens bear in relation and phase to the sheet line. An apparatus and controls are required for the vertical adjustment of the platens in the triple sheet thermoforming methodology.

Still yet another feature of the present invention is that the triple sheet apparatus is generally amenable to being installed upon existing twin sheet machinery so that the art of triple sheet thermoforming can be practiced for advantage at a reasonably lower cost. A triple sheet retrofit apparatus kit can therefore be developed to convert a twin sheet machine into a triple sheet machine. The cost of a proposed retrofit kit would be substantially lower in terms of the economic and lead-time costs associated with the purchase of a new triple sheet machine. A triple sheet retrofit apparatus kit would provide the advantage of enabling practitioners of the twin sheet methodology to improve the articles they produce by advancing to the methods and apparatus attendant with the triple sheet thermoforming inventions disclosed herein.

THE METHODS OF TRIPLE SHEET THERMOFORMING

The method of triple sheet thermoforming is advantageously accomplished by successively molding and fusing three sheets of thermoplastic material together to produce a single article. Triple sheet methods provide significant advantages over standard twin sheet methods. For example, in one embodiment of the method, a second molded sheet is interposed between a first molded sheet and a third molded sheet to provide the advantage of a more rigid article. In another embodiment of the method, a triple sheet article is produced providing two cavities within which two media may be stored. Accordingly, a significant feature of the present invention is the range of applications to which the novel methods of triple sheet thermoforming may be applied.

Characteristic of the sequences of the methods of triple sheet thermoforming are the following steps that occur at the fourth forming station. In Step I, a first sheet is thermoformed upon a first mold mounted to the upper platen, released from a first frame and extracted above the sheet line while under vacuum. In Step II, a second sheet is thermoformed upon a second mold mounted to the lower platen, the first sheet and mold are extended downward to be compressed against the second sheet and mold, fused first and second sheets are then released from the second frame, the first mold ejects the first sheet and retracts above the sheet line, and the fused first and second sheets are extracted below the sheet line with the second sheet remaining upon the second mold while under vacuum. In Step III, a third mold mounted upon the upper platen slides laterally into position above a third sheet, the upper platen extends and the third sheet is thermoformed upon the third mold, fused first and second sheets and the second mold are then extended upward and compressed against the third sheet and the third mold, the second mold ejects the first and second fused sheets while the third mold ejects the third sheet, second and third molds are the third retracted below and above the sheet line, and the triple sheets remain clamped in the third frame. The triple sheet article is indexed forward and is removed at the load/unload station whereafter the sequences of triple sheet thermoforming are repeated in phase at the forming station.

In order to accomplish the method of triple sheet thermoforming it is necessary to provide three heating stations within which three thermoplastic sheets are successively heated to thermoformable temperatures. As will be understood in the detailed description of the present inventions, the dwell time of the three sheets at the three heating stations will be sufficient to bring the three sheets to the temperatures necessary to thermoform the triple sheet article. Such would not be the case if only heating the second and third stations were provided. As will also be seen, in practicing the methods of triple sheet thermoforming it is proposed that heater output at the heating stations be adjustably variable for a range of purposes. These purposes include compensating for the heater output differences of the three heat stations, and compensating for the heat absorption characteristics of up to three specialized thermoplastic sheets wherein one sheet may be filled to provide flexural strength, or others may not equal the average starting gauge of the thermoplastic used.

It is yet another feature of the present invented method to provide three molds against which three thermoplastic sheets are molded and fused together to produce a triple sheet article. The method is practiced with the provision of a slide assembly that holds two molds and is operable to release one mold at a time onto a platen that travels from an open position to a closed position whereat a sheet is thermoformed against a mold surface.

Another feature of the present invented method concerns the triple sheet clamp frames. As noted in the above reference to the characteristic steps of the method, the triple sheet clamp frames receive instructions to open or remain closed in phase while they dwell in the form station. The triple sheet method teaches the controlled operation of the open and closed functions of the triple sheet clamp frames.

Another feature of the triple sheet clamp frames is the method whereby the frames open from the top and the bottom. When a molded sheet is released from the frames so that it can be move out of the way for the next sheet to be molded, the molded sheet can not be obstructed by the invention as it travels away from the sheet line. Twin sheet clamp frames that open from the bottom would prevent a sheet held upon a mold mounted to the upper platen which has been released from the bottom from traveling above the sheet line in order for a second sheet to be thermoformed upon a mold mounted to the lower platen.

Another feature of the present invented method is means for inserting rigidizing structures within the triple sheet article to be thermoformed by the triple sheet methodology. In the sequence of thermoforming and fusing the triple sheet article referred to above, a structure to reinforce the article is placed upon a molded sheet, prior to its compression and selected fusion to another sheet, between Steps II and III. It will also be appreciated that in this manner, such structures as may be placed within the article will be fully encapsulated to provide a robust and durable reinforced triple sheet structure. As may also be understood, automated mechanical means may be employed to deliver a structure to reinforce the article from an inventory of such structures to the desired position and at the designated time to reinforce the triple sheet article to be thermoformed by the triple sheet methodology.

Other features of the present invention are the methods whereby three sheets are fused together to produce a triple sheet article. A range of fusing methods is proposed to facilitate the fusing together of three sheets of thermoplastic to produce a wide range of triple sheet articles. For example, one method describes how three sheets are fused in areas where there is no support or compression resistance. Another method describes how three sheets are fused without collapsing at least one of the three sheets as they are compressed between two platens.

ARTICLES PRODUCED BY TRIPLE SHEET THERMOFORMING

This invention is directed to articles that may be thermoformed by triple sheet apparatus and methods, and in particular to shipping pallets that are constructed for advantage out of three sheets of thermoplastic material.

In one embodiment of the present invention, a nesting pallet constructed out of three sheets of thermoplastic material is proposed. An objective of the nesting pallet is to provide a rigid thermoplastic member that is sandwiched between two outside thermoplastic pallet members. An advantage of this arrangement is that it provides a nesting pallet with superior flexural strength. Another object is to produce a nesting pallet that is devoid of a network of strengthening recesses and fusing points which in combination reduce the load bearing surface area of the pallet. Another object of the present embodiment of the invention is to produce a pallet that is lightweight and 100% recyclable.

In another embodiment of the present invention, a load distributor constructed out of three sheets of thermoplastic material is proposed. An object of the load distributor is to provide a rigid thermoplastic member sandwiched between top and bottom members. An advantage of this arrangement is that it provides a load distributor with increased flexural stiffness. Another object is to provide a rigid thermoplastic member that provides compressive strength where the wheels of the pallet jack are introduced to move the load distributor. Another object of the present embodiment of the invention is to produce a load distributor that is lightweight, low in cost and is 100% recyclable.

In yet another embodiment of the present invention, a light-duty racking pallet constructed out of three sheets of thermoplastic material is proposed. An object of the light-duty racking pallet is to provide a load supporting deck structure that is permanently fused by means of the triple sheet method to a load distributing base structure. A significant advantage of this arrangement is that it eliminates the need to interpose a plurality of feet or legs of the type requiring mechanical fasteners between the upper and lower deck structures as is common in the art of racking pallets. Another object of the present invention is to eliminate mechanical fasteners. Other features of the present embodiment serve the beneficial purposes of reducing costs, simplifying manufacturing, reducing maintenance against wear and tear and providing for simple and efficient recycling of the thermoplastic used to construct such articles as may be thermoformed according to the triple sheet methodology.

In still yet another embodiment of the present invention, a reinforced heavy-duty racking pallet constructed out of three sheets of thermoplastic material is proposed. An object of the heavy-duty racking pallet is to provide a load supporting deck structure that encapsulates a rigid thermoplastic member that provides increased flexural strength and stiffness. Advantages of this arrangement include a pallet that is lightweight, lower in cost and is 100% recyclable, can be reprocessed without knockdown or other added costs, and superior racking strength.

Other features, objects and advantages of the present inventions will become apparent from the following description and appended claims when taken in conjunction with the accompanying drawings.

DESCRIPTION OF THE DRAWINGS

FIG. 5 is a sectional perspective view showing the middle member of the triple sheet article shown in FIG.3;

FIG. 6A is a partial side elevation view showing the nesting characteristics of the triple sheet article illustrated in FIG. 3;

FIG. 6B is a fragmentary cross sectional view showing the triple sheet article of FIG. 3;

DETAILED DESCRIPTION OF THE PREFERRED EMBODIMENT

Figure 1:
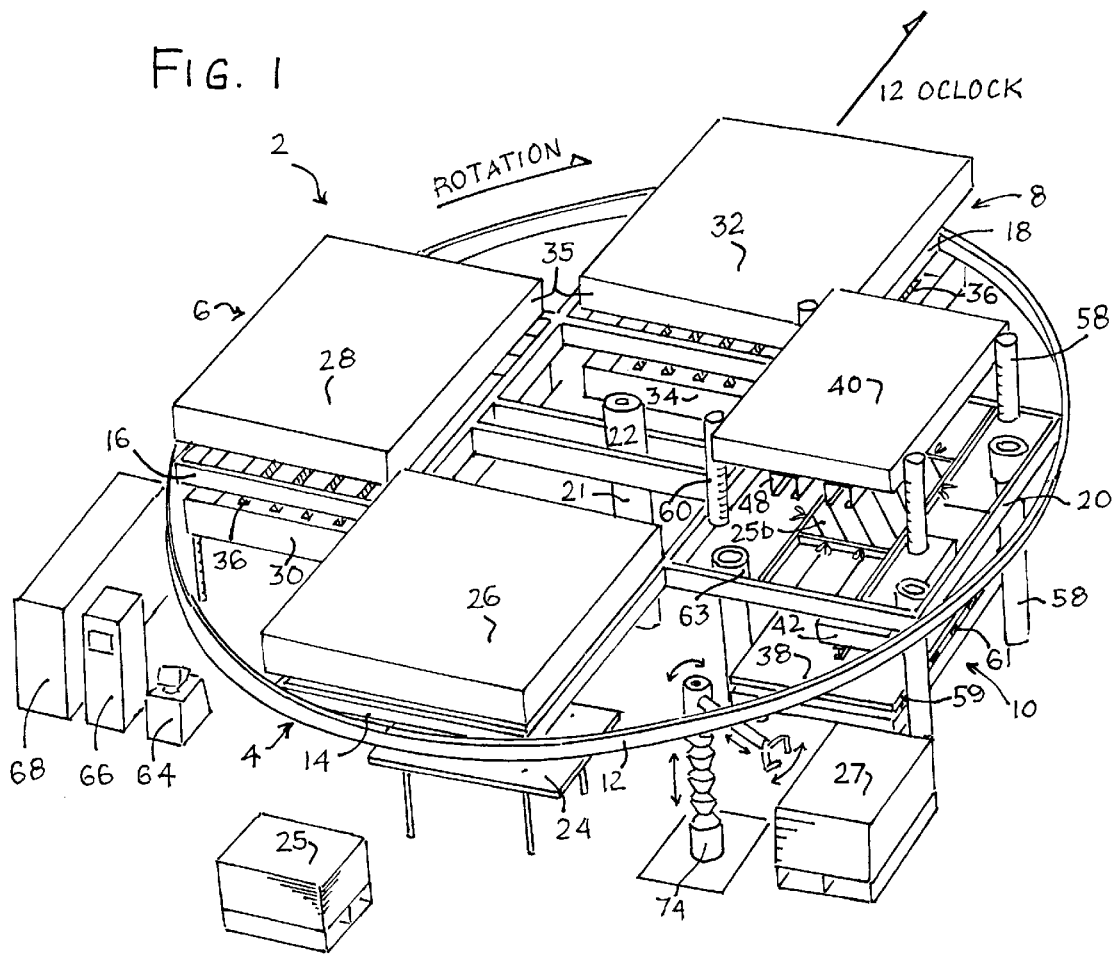
FIG. 1 is a perspective view of one embodiment of a triple sheet thermoforming machine.

The triple sheet thermoforming machine 2 shown in FIG. 1, broadly considered, includes a first load/unload station 4, a second pre-heat oven station 6, a third final heat oven station 8, and a fourth forming station 10. Also included in thermoforming machine 2, is wheel 12, comprising a first clamp frame 14, a second clamp frame 16, a third clamp frame 18 and a fourth clamp frame 20. Wheel 12 rotates clockwise about a shaft 21 at axis 22 driven by a suitable motor (not shown) in a known manner.

First load/unload station 4 includes a load/unload table 24, which operates in vertical motion to deliver thermoplastic sheet 25 to frames 14, 16, 18 and 20. Above table 24 and wheel 12, resides a first top oven 26. Second pre-heat oven station 6 includes a second top oven 28 and a first bottom oven 30. Third final heat oven station 8 includes a third top oven 32 and a second bottom oven 34. The five ovens 26, 28, 30, 32 and 34 are shrouded in sheet metal 35 to reflect the radiant energy emitted from electric infrared heaters 36. First top oven 26 operates to travel upward to prevent articles rotating into load/unload station 4 from form station 10 from impacting against sheet metal 35 shrouding oven 26. First top oven 26 is controlled to travel upward at the end of each complete part production cycle.

Fourth forming station 10 includes a lower platen 38 and an upper platen 40. Upon lower platen 38 resides a second thermoforming mold 42. Upon upper platen 40 resides a first thermoforming mold 44 and a third thermoforming mold 46 (see FIG. 2). Also upon upper platen 40 is slide structure 48, which operates to shift thermoforming molds 44 and 46 laterally into positions aligned vertically with frames 14, 16, 18 and 20 as they traverse into form station 10. Lower and upper platens 38 and 40 further include lower and upper mechanical platen drive motors (not shown) which operate to extend and retract the platens in selected vertical and mold relative alignment with the frames carrying sheet about lower gear racks 58 and upper gear racks 60. Included with lower platen 38, and optionally with upper platen 40, are auxiliary apparatuses for extending the platens further to compress the surfaces of thermoforming molds 42, 44 and 46 against each other to complete the fusing procedures contemplated in the preferred embodiments of the present invention. Such auxiliary apparatus may include, but are not limited to, bolster plates 59, air bags 61 receiving compressed air, bayonets 63, electromechanical platen drives, linear transducers and platen brakes. Both sets of apparatus are operable to interlock the platens relative to the other to facilitate the selective fusing of three sheets through the heat and compression of the present invention.

Also seen in FIG. 1 are other apparatuses necessary for the triple sheet thermoforming machine 2 proposed in the preferred embodiments. Computer console 64 is shown in close proximity to a PLC 66. PLC 66 controls switching gear (not shown) controlling ovens 26,28,30,32 and 34 in an oven control cabinet 68. Also included, but not shown, are infrared sensors that operate to adjust oven temperatures in response to variation. Also shown is an inventory of rigidizing structures 72, which can be placed within the thermoplastic articles that may be thermoformed according to the triple sheet methodology. An automated mechanical apparatus 74 acts to deliver structures 72 to desired positions within form station 10 in cooperation with the twin and triple sheet fusing procedures proposed in the production of thermoplastic articles according to the present invention. Additionally disclosed in reference to PLC 66 are controls (not shown) instructing clamp frames 14, 16, 18 and 20 to open or remain closed in phase with the triple sheet methodology deployed to make the triple walled articles of the present invention. Also shown in reference to PLC 66 are conventional machine controls and novel form station controls for the operation of the triple sheet thermoforming machine, which include platen functions and slide apparatus instructions.

Figure 2:
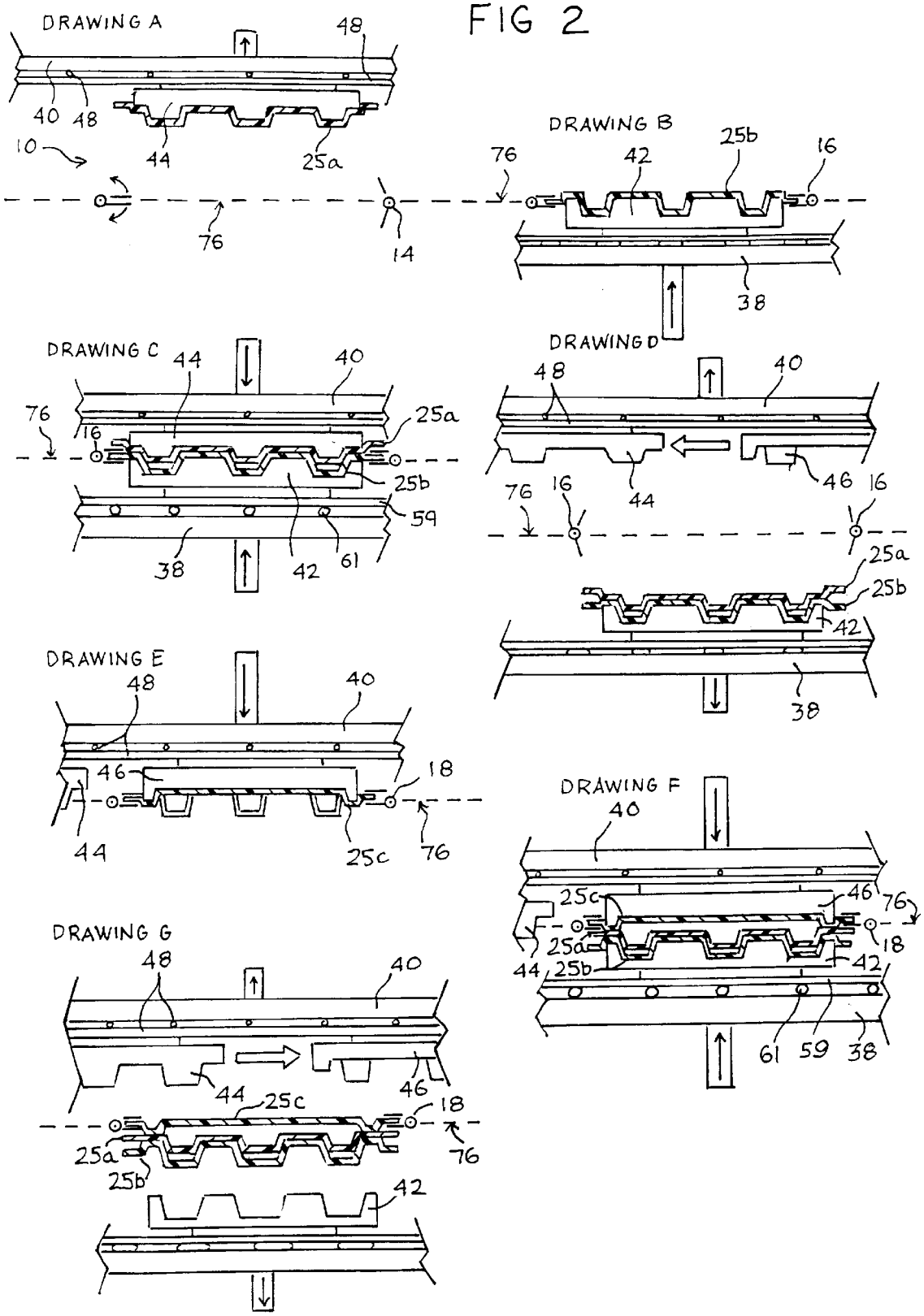
FIG. 2 is a schematic side elevation view showing the sequences of one of the triple sheet methods proposed in the present invention.
Figure 3:
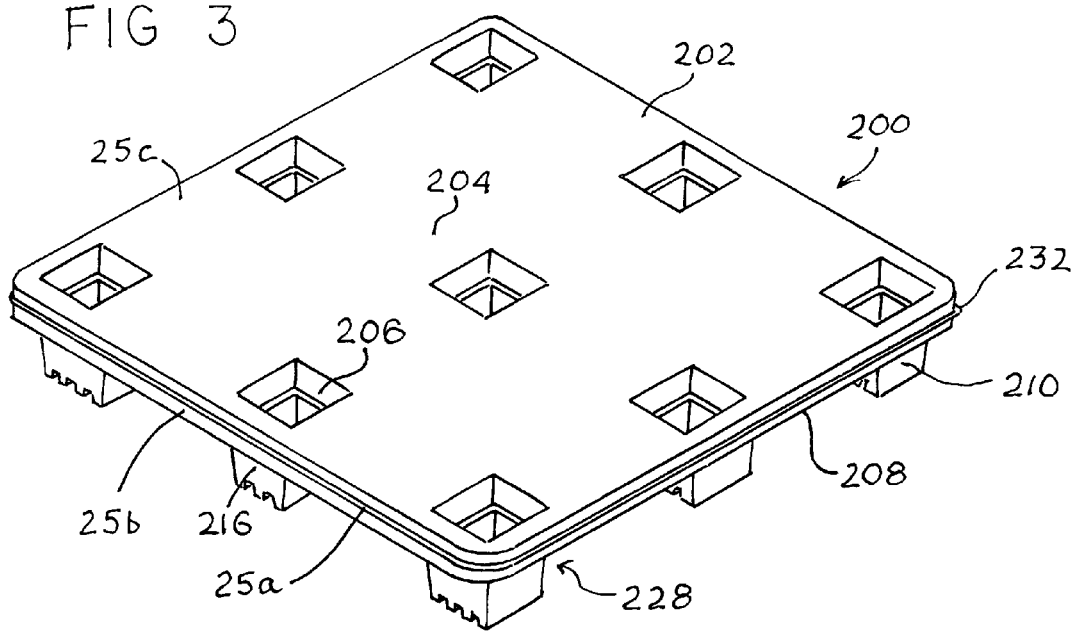
FIG. 3 is a perspective view of a nesting pallet.
Figure 4:
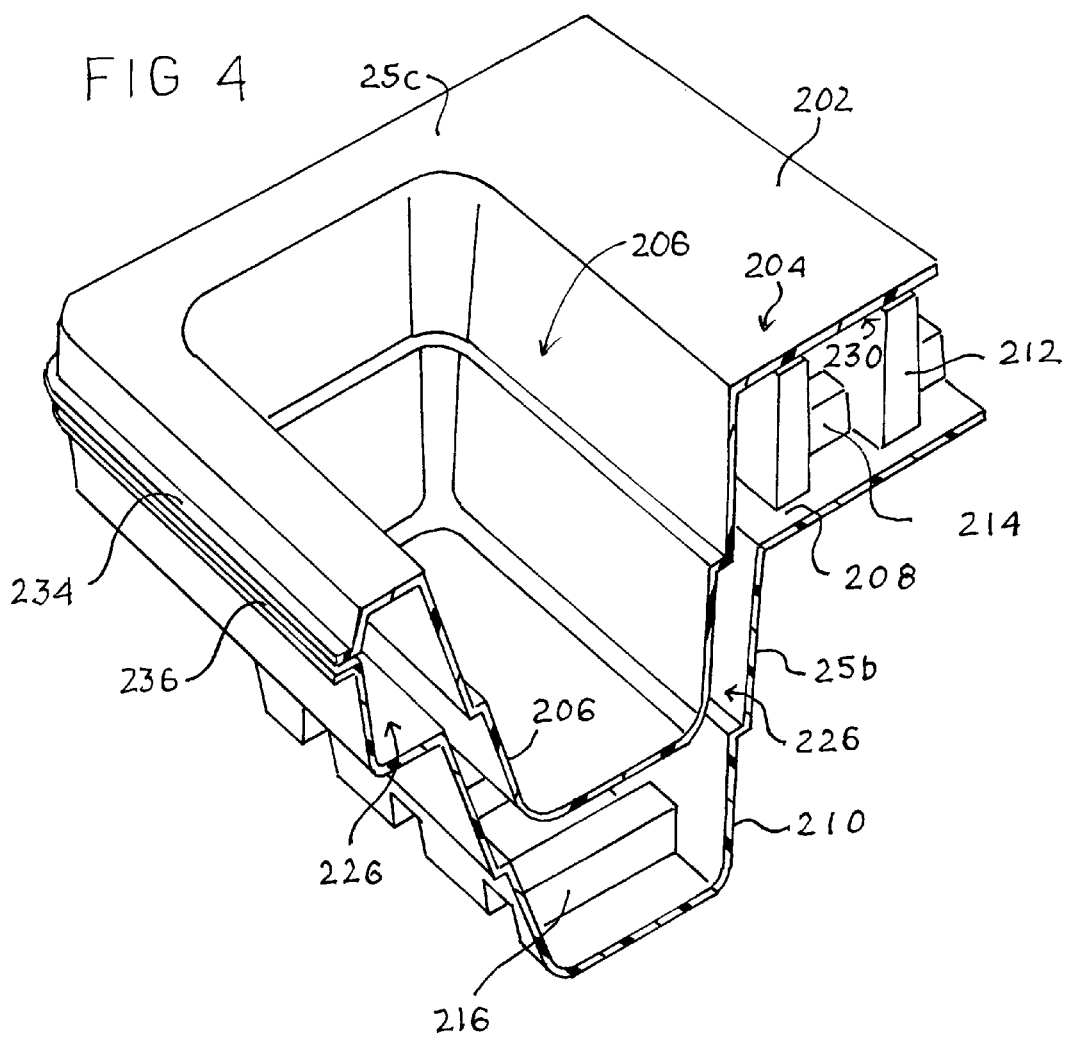
FIG. 4 is a sectional perspective view showing only the top and bottom members of the triple sheet article presented in FIG. 3.

FIG. 2 illustrates one possible triple sheet forming sequence of the present invention. Also, it is understood that the terms "to mold", "molding" and "molded" are used to refer to the process by which a thermoplastic sheet is permanently displaced against the surface of a mold by the combined effects of heat, differential pressure and cooling.

FIG. 2A serves to demonstrate the molding of sheet 25a upon upper mold 44; the unclamping of sheet 25a from first frame 14; and, the retraction of upper platen 40 from sheet line 76 with sheet 25a under vacuum upon first mold 44. FIG. 2B serves to demonstrate the molding of sheet 25b upon second mold 42 located on lower platen 38; and, the retention of molded sheet 25b upon lower mold 42 in frame 16 at the sheet line 76. FIG. 2C serves to demonstrate the downward extension of upper platen 40 with molded sheet 25a upon upper first mold 44 onto and against molded sheet 25b upon second mold 42; the upward compression of lower platen 38 against upper platen 40; and, the selective fusing of portions of heated molded sheet 25a to selected portions of heated molded sheet 25b, thus completing the twin sheet formation and fusion of sheets 25a and 25b. FIG. 2D serves to demonstrate the ejection of molded sheet 25a from upper mold 44; the upward retraction of upper platen 40; the horizontal sliding action of second upper mold 46 into the vertically aligned position occupied earlier by first upper mold 44; the further actions of the release of twin sheet 25a and 25b from second frame 16; and, the retraction, while molded sheet 25b is under vacuum upon lower mold 42, of lower platen 38 from sheet line 76. FIG. 2E serves to demonstrate the molding of sheet 25c upon second mold 46 located upon upper platen 40; and, the retention of sheet 25c under vacuum upon second upper mold 46 in third frame 18. FIG. 2F serves to demonstrate upward extension of lower platen 38, carrying twin sheet 25a and 25b upon lower mold 42 to molded sheet 25c upon second upper mold 46; the upward compression of lower platen 38 against upper platen 40; and, the selective fusing of portions of molded sheet 25a to selected portions of molded sheet 25c, thus completing the triple sheet formation and fusion of sheets 25a, 25b and 25c. Finally, FIG. 2G serves to demonstrate the ejection of sheet 25c from upper mold 46 and sheet 25b from lower mold 42; the retraction of upper platen 40 and lower platen 38 from sheet line 76; the horizontal sliding action of first upper mold 44 into the vertically aligned position occupied earlier by second upper mold 46; and, the retention of sheet 25c in third frame 18, operable to carry the triple sheet article to load/unload station 4 to complete the triple sheet thermoforming operation.

The triple sheet article proposed in the triple sheet method shown in FIG. 2 is illustrated to advantage in FIGS. 3, 4, 5, 6A and 6B. Triple sheet article 200 represents one of the many proposed embodiments of the invention, and is a nesting pallet 202. As can be seen, nesting pallet 202 comprises a first sheet 25c forming a substantially flat load supporting deck 204 and nine depending legs 206, and a second sheet 25b forming a deck under carriage 208 and nine supporting legs 210, that are vertically disposed beneath and receive depending legs 206. Second sheet 25b forming deck under carriage 208 also includes a plurality of raised bosses 212, bridging bosses 214 and stiffening ribs 216.

Also included in nesting pallet 202, is third sheet 25a, which is shown for better effect in FIG. 5. As can be seen, third sheet 25a is engineered to stiffen nesting pallet 202 and to maintain first and second sheets 25c and 25b in spaced parallel relation. Third sheet 25a forms rigid structure 218, comprising a plurality of raised ribs 220 that extend upward to meet first sheet 25c, and a plurality of recessed ribs 222 that extend downward to meet second sheet 25b. Also included in third sheet 25a are nine rigid leg structures 224 that bridge the gap 226 (see FIG. 4) formed between the legs 206 and 210 of sheets 25c and 25b, respectively, to reinforce the nine nesting pallet legs 228. Also understood is that raised bosses 212 bridge the gaps 230 formed between the recessed ribs 222 molded into third sheet 25a, such that the bosses 212 and ribs 222 combine to produce a strong pallet structure able to withstand the stresses expected to be experienced by the nesting pallet 202.

First, second and third sheets 25a, 25b and 25c, when heated to a thermoformable state, are permanently fused together to form a single triple sheet article 200 through the application of pressure produced by the sequential compression of molds 44 and 42, and molds 46 and 42, between platens 38 and 40 in the triple sheet thermoforming sequence illustrated in FIG. 2. In particular, a plurality of selective fusion points will occur at the places where third sheet 25a extends upward to meet first sheet 25c, where third sheet 25a extends downward to meet second sheet 25b, and about the perimeter flange 232 of nesting pallet 202 where a margin 234 of sheet 25c, a margin 236 of sheet 25b and a margin 238 of sheet 25a overlap to form a compressed and a resilient seam 240 (see FIG. 6B).

In FIG. 6A two nesting pallets 202 are shown to illustrate the nesting characteristic of the proposed triple sheet article 200. As shown, depending leg 206 of first sheet 25c receives supporting leg 210 of sheet 25b, shown in phantom, to enable nesting and consolidated storage and shipment of triple sheet articles 200.

The triple sheet nesting pallet 202 advantageously has a substantially flat load supporting deck surface 206. This arrangement provides increased areas of surface contact and load support, thereby overcoming problems of twin sheet nesting pallets characterized in U.S. Pat. No. 4,428,306 which proposes a network of deck recesses for the purposes of reinforcement and stiffening. The proposed arrangement of a substantially flat deck 206, reinforced and supported by rigid structure 218, also uniquely overcomes the fluid and debris buildup problems associated with twin sheet pallet decks extensively recessed to form knit or fusion points with underlying molded sheets, as is characterized by U.S. Pat. No. 5,391,251. Finally, rigid structure 218, thermoformed from sheet 25a and encapsulated between sheets 25c and 25b, is an advantageous and novel approach to the manufacture of nesting pallets. This arrangement offers an alternative approach to reinforcing nesting pallets thermoformed according to the twin sheet methodology with metal, wood or non-thermoplastic reinforcing bars and members, such as is set forth in U.S. Pat. Nos. 5,596,933 and 5,042,396. The arrangement illustrated to advantage in FIG. 2 produces a superior thermoplastic triple sheet article 200 that is lightweight, resistant to permanent deflection cause by the bending or failure of the non-plastic reinforcing member, that is easy, safer and lower cost to manufacture, and is 100% recyclable for efficient and economical reprocessing. Accordingly, it is seen that the triple sheet methods and apparatus disclosed herein provide a significant leap forward in the art to which the invention is applied.

Figure 7:
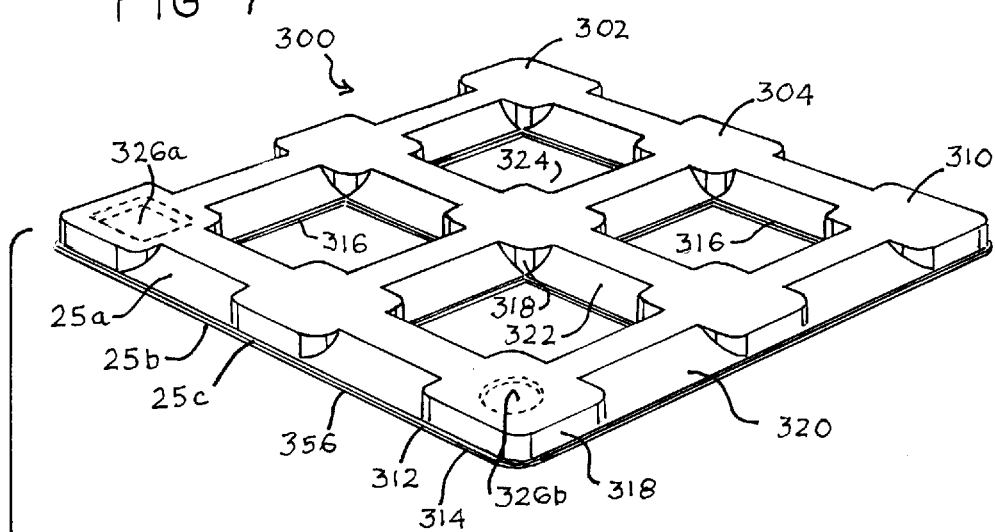
FIG. 7 is a perspective view showing the top member of another representation of a triple sheet article processed in accordance with sequences, methods and apparatus presented in FIG. 2.
Figure 8:
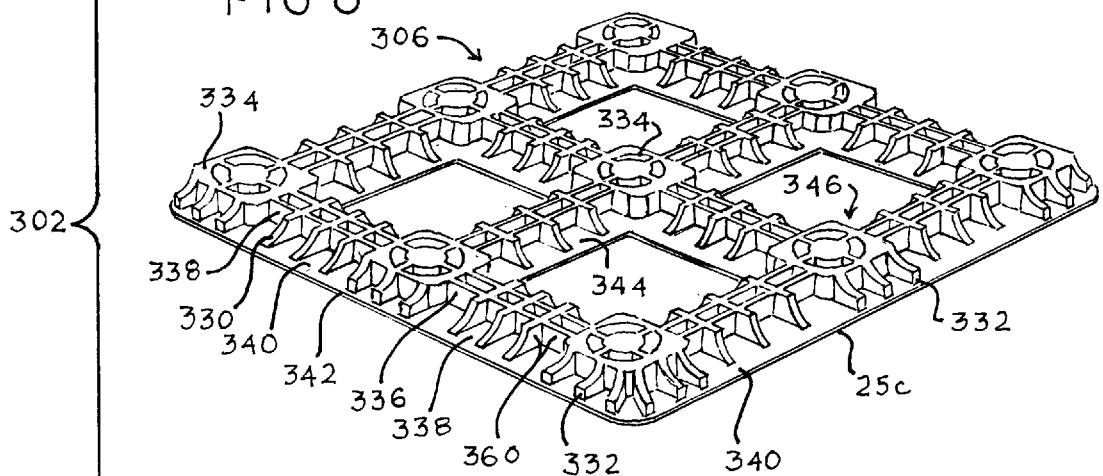
FIG. 8 is a perspective view of a middle member of the triple sheet article shown in FIG. 7.
Figure 9:
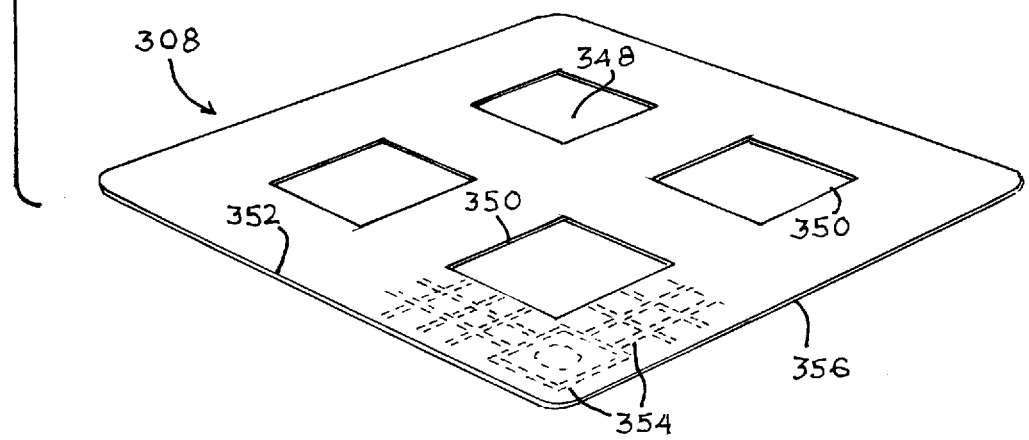
FIG. 9 is a perspective view showing a bottom member of the triple sheet article shown in FIG. 7.

Referring again to FIG. 2, it will be understood that the procedures of the triple sheet methodology can be applied to the manufacture of triple sheet article 300, shown to advantage in FIGS. 7, 8 and 9. Triple sheet article 300 is known within the material handling industry as a load distributor 302. Load distributor 302 operates to distribute over a wider area the focused pressure transferred by the legs 228, such as is disclosed in nesting pallet 202, upon the contents of a loaded pallet to reduce possible damage. Efforts have been made to further increase the load bearing strength of twin sheet molded load distributors, and U.S. Pat. No. 5,758,855 to Cadillac teaches the placement of a flexible tensile member within the pallet structure to increase flexural strength of the load distributor. Although the Cadillac arrangement is an advancement upon prior load distributing articles, it has several problems that are overcome with the novel methodology of triple sheet thermoforming.

As seen in FIG. 7, load distributor 302 includes an upper deck 304 formed from sheet 25a, a rigidizing structure 306 formed from sheet 25c and load distributing surface 308 formed from sheet 25b. Upper deck 302 includes raised deck portions 310 elevated above the rectangular plane 312 formed by outer margins 314 and inner margins 316 of sheet 25a. Interposed between raised deck portions 310 and margins 314 and 316 are substantially perpendicular surfaces 318, outer ramp surfaces 320 and inner ramp surfaces 322. Inner margins 314 and inner ramp surfaces 322 define four load distributing surface cutouts 324. Outer and inner ramp surfaces 320 and 322, respectively, are adapted to allow the wheels of a pallet jack to cross over the raised deck portions 310 to access cutouts 324 from the four sides of load distributor 302. Also provided in load distributor 302, may be a plurality of leg receiving elements 326a or 326b (shown in phantom) suitable for locating and retaining the legs 228 in position upon upper deck 304.

FIG. 8 shows rigidizing structure 306 thermoformed from sheet 25c in the proposed triple sheet methodology. Structure 306 is engineered to stiffen load distributor 302 and maintain upper deck 304 and load distributing surface 308 in space parallel relation. Structure 306 comprises raised ramp support bosses 330, perpendicular surface bosses 332, raised leg supporting bosses 334 and ribs 336 bridging the gaps 338 formed between the ramp support bosses 330 and the leg supporting bosses 334. Also included in structure 306, are outside margins 340 defining the perimeter border 342 and inside margins 344 defining four cutouts 346 adapted to accommodate the wheels of a pallet jack from the four sides of the load distributor 302.

Load distributing surface 308, formed from sheet 25b in the proposed triple sheet method, is illustrated in FIG. 9. Load distributor surface 308 is shown to be flat and operates to distribute over a wider area the focused pressure transferred by the legs 228 of loaded pallet 202. Also included in load distributor surface 308 are four cutouts 348, inner cutout margins 350 and outer margins 352. As will be understood, when structure 306 and surface 308 are compressed together in the triple sheet procedure represented by FIG. 2C, structure 306 and underlying surface 308 will be selectively and permanently fused together by the combined effects of thermal bonding and pressure in the overlapping margins 340 and 344 of structure 306 and underlying margins 350 and 352 of surface 308. Partial representations of the areas of select fusing 354 are shown to advantage in phantom in FIG. 9 such that a permanent bond is created therebetween to form a resilient seam 356. Although not disclosed in FIG. 9, it is possible to increase the flexural stiffness of load distributor 302 by forming upward extending underlying bosses in surface 308, such that these bosses extend upward to bridge the vertical surfaces 360 of bosses 330, 332 and 334 and ribs 336 formed in structure 306 of load distributor 302.

Triple sheet article 300, as shown in FIGS. 7, 8 and 9, is offered to demonstrate the unique and novel features, objects and advantages that the triple sheet thermoforming methods and apparatus invented and proposed herein have to advance the art in the end market application to which the invention is applied. It is seen that twin sheet articles, such as load distributors, can be reinforced to significant advantage with thermoplastic members molded in the triple sheet methodology rather than by non-thermoplastic members such as is disclosed in the prior art. The triple sheet article shown here for example produces a lower cost, lighter weight and 100% thermoplastic article that provides the flexural stiffness that is required for the application. Additionally, it will be seen that in the present example, ramp support bosses 330 and bridging ribs 336 provide significant compressive strength in the raised deck portions 310 where the wheels of a pallet jack are introduced to transport the loaded pallet from location to location. Accordingly, it is seen that the triple sheet methods and apparatus disclosed herein provide a significant leap forward in the art to which the invention is applied.

Referring again to FIG. 2, first upper oven 26 is needed above load/unload station 4. In conventional twin sheet thermoforming methods and apparatus, oven stations are required to preheat and heat two successive thermoplastic sheets to an elevated temperature suitable for thermoforming. But with the addition of third thermoplastic sheet 25c, it is necessary to add extra heat capacity to facilitate the triple sheet process contemplated in the present invention. As is generally understood in the art of thermoforming HDPE, a rule of thumb is that 1 second or less of radiant heat for each $\frac{1}{100}$ inch of material thickness is required to elevate the thermoplastic sheet to a suitable thermoforming state. Therefore, if the starting gauge of the thermoplastic sheet is 0.125 inches thick, a heating duration of 125 seconds or less within an oven having 30 wsi at 50%+/−average power output is required. According to the twin sheet methodology, 125 seconds of heat is applied to each sheet over a total duration split between the oven stations. In this manner, the approximate duration of time the two successive sheets reside within each oven is +/−62.5 seconds. It is also understood in the twin sheeting art that the formation of a first thermoplastic sheet over a first thermoforming mold is closely followed by the formation of a second thermoplastic sheet over a second thermoforming mold, which in turn is closely followed by the subsequent fusing of the two formed sheets while the first and second formed sheets remain at relatively high temperatures for the thermal bonding and selective fusing processes of the twin sheet methodology. Accordingly, it may be seen that in the twin sheet process there are heating periods, forming periods, fusing periods and cooling periods, which progress in known manner, such that the forming, fusing and cooling periods are substantially equal in length to the heating periods of the subsequent pair of thermoplastic sheets being heated in the oven stations.

In the triple sheet thermoforming process, the heating, forming, fusing and cooling periods may progress in unequal time duration. Thus, the total time permitted for each sheet in each of the three ovens may range in the order of +/−66%. Specialized oven process control is therefore preferred to accommodate the varying heat cycles and time durations that sheets 1, 2 and 3 dwell in ovens 1, 2 and 3 in the triple sheet thermoforming apparatus. Accordingly, oven process control is used to equalize the total amount of heat that is applied to the 3 sheets as each sheet is indexed forward from oven 1 through oven 3. Table 1, shown below, serves to illustrate the amount of time each sheet dwells in the ovens of the proposed methodology:

TABLE 1

|  | Oven 1 | Oven 2 | Oven 3 | Total Time |
|---|---|---|---|---|
| Sheet 1 | 20 | 40 | 60 | 120 |
| Sheet 2 | 40 | 60 | 20 | 120 |
| Sheet 3 | 60 | 20 | 40 | 120 |
|  | 120 | 120 | 120 |  |

In the current art, it is standard to regulate the amount of energy emitted by the heaters of the oven according to percentage timers or the like. Also, an oven may be separated into two or more zones so that each zone can be independently regulated relative to several known factors. For example, zones within the oven corresponding to the outer margins of the sheet may be regulated to emit energy in the form of heat for six of every ten seconds while the zones corresponding to the center areas of the sheet may be regulated to emit energy in the form of heat for four of every ten seconds. Thus in the current art ovens are regulated independently and in constant ten +/− second intervals in phase with the single or twin sheet thermoforming methodology.

In the triple sheet method, however, the amount of radiant energy applied to each sheet will vary according to the duration of time each sheet spends in each oven. It is also understood that Oven 1, with only a single upper bank of infrared heating elements, will have to be adjusted to increase its heat output for sheet 3 relative to sheet 1 of the proposed process because oven 1 normally produces 15+ wsi versus 30+ wsi for ovens 2 and 3, with two oven banks each. Therefore, rapid response infrared emitters are preferred in first upper oven 26. A processing algorithm can be used to adjust the heater output of this and preferably all 5 ovens in order to match heater output to the heat absorption characteristics of the three sheets to be thermoformed according to the triple sheet method. Therefore, heater output in the triple sheet methodology is further regulated by controllers relative to the duration of time that each of the three successive frames carrying three successive sheets dwells in the three ovens. Means of oven control and processing algorithms are objects for the triple sheet methodology.

Figure 10:
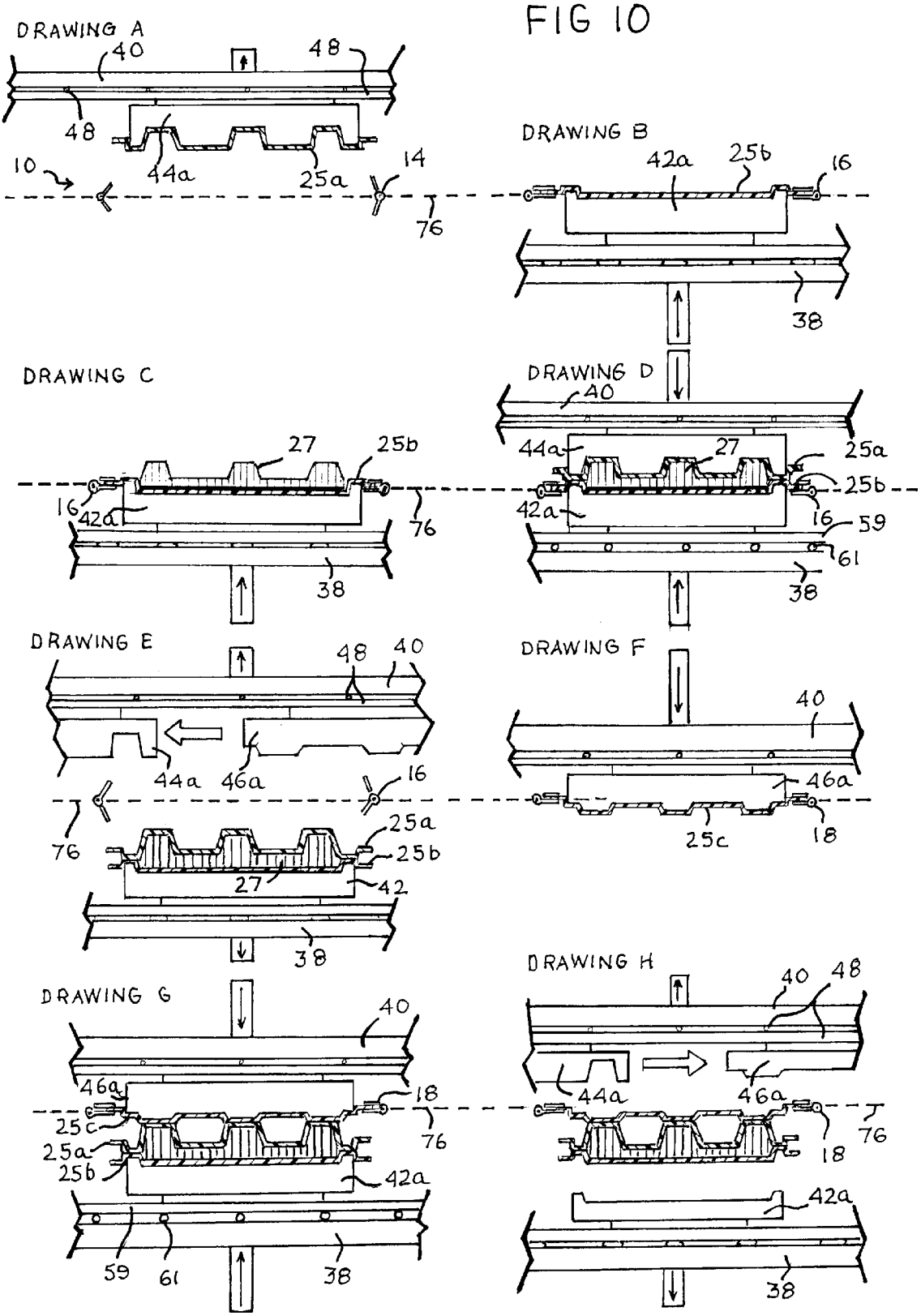
FIG. 10 is a schematic side elevation view showing another method sequence of the present invention.

FIG. 10 illustrates another possible triple sheet forming sequence of the present invention. FIG. 10A serves to represent form station 10 and to demonstrate the molding of sheet 25a upon upper mold 44a, the unclamping of sheet 25a from first frame 14, and the retraction of upper platen 40 from sheet line 76 with sheet 25a under vacuum upon first mold 44a. FIG. 10B serves to demonstrate the molding of sheet 25b upon second mold 42a located on lower platen 38 and the retention of molded sheet 25b upon lower mold 42a in frame 16 at sheet line 76. FIG. 10C serves to demonstrate the insertion of thermoplastic rigid member 27 onto molded sheet 25b from above the sheet line. FIG. 10D serves to demonstrate the downward extension of upper platen 40 with molded sheet 25a upon upper first mold 44a onto and against molded sheet 25b and rigid member 27, both upon second mold 42a. FIG. 10D also shows the upward compression of lower platen 38 against upper platen 40 and the selective fusing of portions of heated molded sheet 25a to selected portions of heated molded sheet 25b, as well as the bonding of heated thermoplastic sheets 25a and 25b to rigid, optionally pre-treated, thermoplastic member 27. This completes the twin sheet formation of sheets 25a and 25b and encapsulation of rigid member 27 therebetween. FIG. 10E serves to demonstrate the ejection of molded sheet 25a from upper mold 44a, the upward retraction of upper platen 40, the horizontal sliding action of second upper mold 46a into the vertically aligned position occupied earlier by first upper mold 44a, the further actions of the release of twin sheet 25a and 25b from second frame 16, and the retraction, while molded sheet 25b remains under vacuum upon lower mold 42a, of lower platen 38 from sheet line 76. FIG. 10F serves to demonstrate the molding of sheet 25c upon the second mold 46a located upon the upper platen 40 and the retention of sheet 25c under vacuum upon second upper mold 46a in third frame 18 at sheet line 76. Furthermore, FIG. 10G serves to demonstrate the upward extension of lower platen 38, carrying twin sheets 25a and 25b as well as encapsulated rigid member 27 upon lower mold 42a to molded sheet 25c upon second upper mold 46a, the upward compression of lower platen 38 against upper platen 40, and the selective fusing of portions of molded sheet 25a to selected portions of molded sheet 25c, thus completing the triple sheet formation of sheets 25a, 25b and 25c. Finally, FIG. 10H demonstrates the ejection of sheet 25c from upper mold 46a and sheet 25b from lower mold 42a, the retraction of upper platen 40 and lower platen 38 from sheet line 76, the horizontal sliding action of first upper mold 44a into the vertically aligned position occupied earlier by second upper mold 46a, and the retention of sheet 25c in third frame 18, operable to carry the triple sheet article to load/unload station 4 to complete the triple sheet thermoforming operation.

Figure 11:
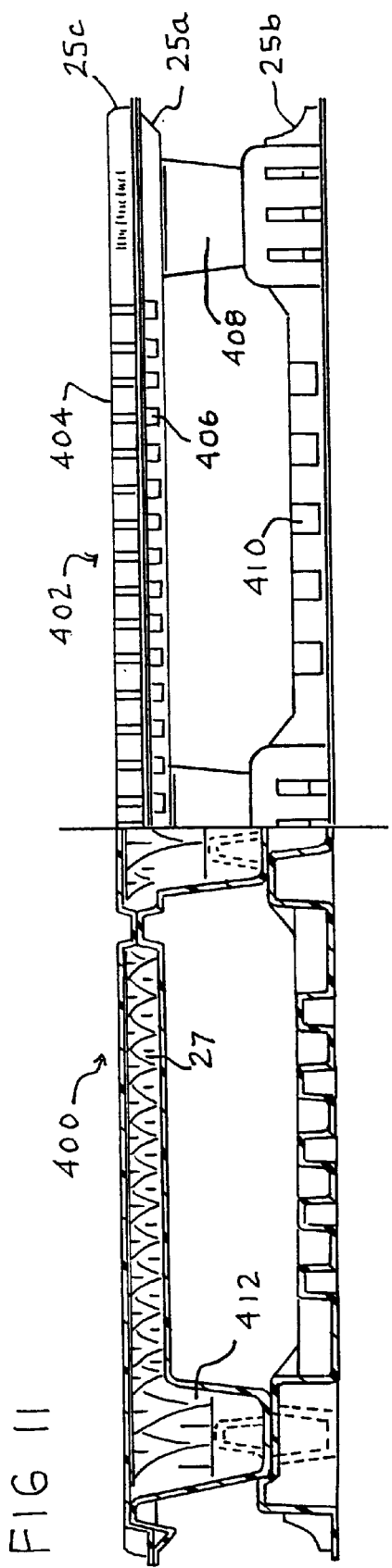
FIG. 11 is a side elevation view in partial section showing one embodiment of a triple sheet article according to FIG. 10.
Figure 12:
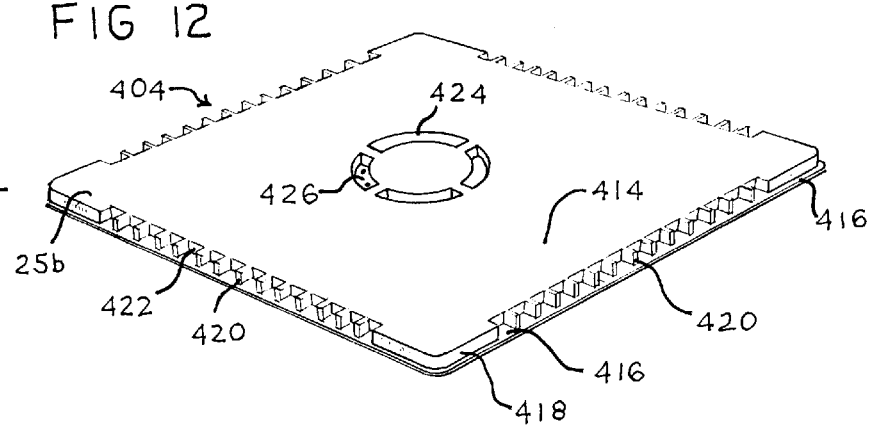
FIG. 12 is a perspective view of a top member of the article of FIG. 11.
Figure 13:
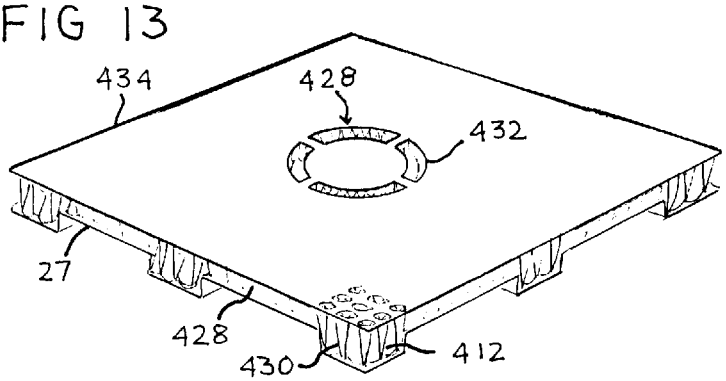
FIG. 13 is a perspective view of a reinforcing member of the article of FIG. 11.
Figure 14:
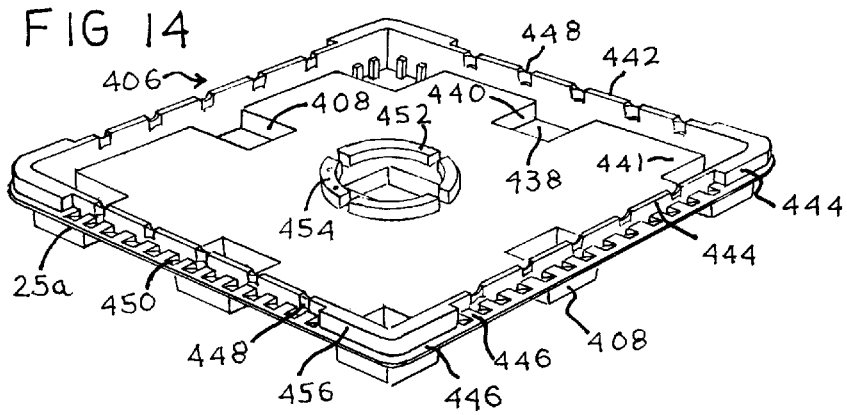
FIG. 14 is a perspective view of a middle member of the article of FIG. 11.
Figure 15:
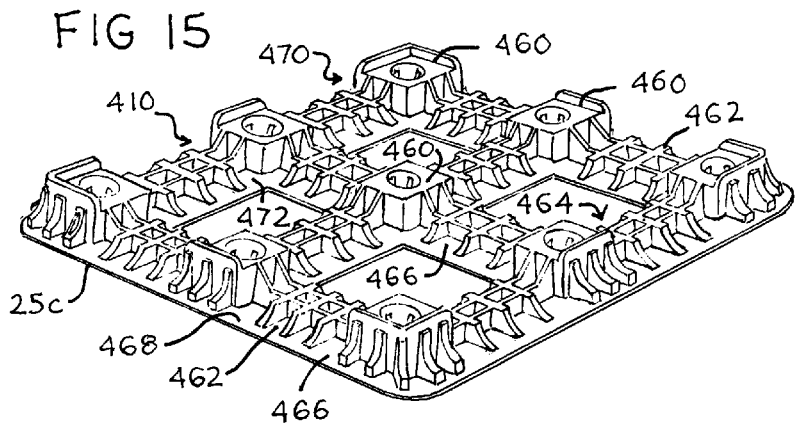
FIG. 15 is a perspective view of the bottom member of the article of FIGS. 9 and 10.

The resultant triple sheet article made in accordance with the process of FIGS. 10A–H, is illustrated to advantage in FIGS. 11, 12, 13, 14 and 15. Triple sheet article 400, representing one of the many proposed embodiments of the invention, is a rackable pallet 402. As can be seen in FIGS. 10H and 11, racking pallet 402 comprises a first sheet 25b thermoformed over mold 44a to form a rectangular substantially flat load supporting deck 404, a second sheet 25a thermoformed over mold 42a to form a deck under carriage 406 with nine supporting legs 408, and a third sheet 25c thermoformed over mold 46a to form a lower support structure 410. Optionally interposed between said first and second sheets 25b and 25a is thermoplastic rigid member 27, also including nine depending rigid legs 412, which together combine to provide racking pallet 402 with added flexural stiffness.

Now referring in greater detail to the FIGS. 12, 13, 14 and 15, it will be seen that load support deck 404 comprises a substantially flat deck surface 414 surrounded by a depending horizontal margin 416. Joining deck surface 414 and margin 416 are eight perpendicular corner walls 418 and four perpendicular inner walls 422. Disposed between corner walls 418 and extending outward from said inner walls 422 are a plurality of ribs 420 operable to absorb impacts and stiffen pallet 402. Centrally located on flat deck surface 414 are four depending recesses 424, which extend down to the horizontal plane formed by margin 416 to form central select fusing surfaces 426.

Rigid thermoplastic member 27 is located below load support deck 404. Rigid thermoplastic member 27 is constructed out of the same thermoplastic material used to construct sheets 25a, 25b and 25c. Rigid member 27 is formed from a single sheet of heated thermoplastic expanded between two heated die plates to thermoform a hybrid honeycomb structure. As can be seen, rigid member 27 comprises a main deck support body 428 and optionally nine leg support structures 430. Four cutouts 432 are centrally located in rigid member 27 and cutouts 432 receive four depending recesses 424 formed in support deck 404. Rigid member 27 is defined by outside boarder 434.

Deck under carriage 406 is disposed below rigid thermoplastic member 27. Deck under carriage 406 comprises a main, substantially flat under carriage body 436, nine depending leg recesses 438, four rigid member retention walls 440, contiguous to retention walls 440 horizontal surfaces 442, contiguous to horizontal surfaces 442 downward extending surfaces 444, and contiguous to downward extending surfaces 444 a horizontal margin 446. Horizontal margin 446 is substantially coincident in the vertical plane to horizontal margin 416 formed in deck surface 414. In more detail, deck under carriage 406 further comprises reinforcing webs 448, fork tine deflector details 450, and centrally located, four upward extending bosses 452 forming central select fusing surfaces 454. It may also be seen that outside border 456 includes downward extending surfaces 444 of deck under carriage 406, which cooperate and are compression molded against the eight perpendicular corner walls 418, the four perpendicular inner walls 422, and the remaining margin 416 comprising flat deck surface 414. Also understood in the formation of the four retention walls 440 is holding space 441 for rigid member.

Lower pallet support structure 410 is positioned below deck under carriage 406. It is understood that support structure 410 operates as a load distributor 470 and comprises nine upward extending leg supports 460, twelve raised rib ramp structures 462, four pallet jack cutouts 464, and flat surfaces 466 generally defining an outside horizontal margin 468 and four separate inside horizontal margins 472. As can be seen, support structure 410 is heavily detailed with a plurality of bosses, ribs, webs, gussets, retention walls, depressions, margins and the like to produce a load distributor 470 with both flexural stiffness and load pressure distribution capabilities.

Referring to FIGS. 19, 10A, 10G, and 11, it may also be appreciated that a fifth member substantially equal to load distributing surface 308 may be thermoformed over a third mold residing upon the slide structure 48 affixed to upper platen 40, such that upon the completion of the procedure characterized by FIG. 10G, the third frame 18 opens, lower platen 38 retracts, a fourth sheet is engaged by fourth frame 20 rotates into form station 10 and is thermoformed over laterally slideable mold 47, and article 400 is brought up by lower platen 38 to be compressed against and fused to pallet support structure 410 to produce a Quadruple sheet article 403 (not shown) in accordance with an advanced methodology to be referred to as Quadruple Sheet Thermoforming.

Racking pallet 402 is thermoformed according to one embodiment of the triple sheet methodology into a single article 400 comprised of four thermoplastic members. The four thermoplastic members are permanently fused together according to the heating, forming, fusing and cooling methods and apparatus proposed in the present invented triple sheet thermoforming machine 2. Accordingly, it will be understood that triple sheet article 400 demonstrates some of the unique and novel features, objects and advantages that the triple sheet thermoforming methods and apparatus invented and proposed herein have to advance the art in the end market application to which the invention is applied. Racking pallets represented in the prior art, which are characteristically constructed of two or more separately thermoformed twin sheet structures that are in practice joined by mechanical fasteners, can be advantageously thermoformed into a single structure in one part production cycle of the triple sheet methodology. Thus, the mechanical fasteners and the optional plurality of separate leg supports required to maintain an upper load supporting deck and a lower load distributor in fixed and spaced parallel relation characteristic of the prior art can be eliminated altogether to significant advantage. Further, by encapsulating a rigid thermoplastic member within an enveloping structure formed by two thermoplastic sheets that are permanently fused to a thermoplastic load distributor, it will be understood that the disadvantages characteristic of the prior art, in respect to non-thermoplastic reinforcing members and mechanical fasteners, will be overcome to produce a lightweight, low cost, structurally rigid and 100% recyclable racking pallet that can be reprocessed without knock down or other added costs. Accordingly, it is seen that the triple sheet methods and apparatus disclosed herein provide a significant leap forward in the art to which the invention is applied.

It is intended in the triple sheet method that the procedures of molding the envelope, adding the rigid insert and compressing the three members between the two platens occurs in fast succession and while the heated molded thermoplastic sheets retain their ability to achieve interfacial contact and fusion through the principle of hot tack adhesion, which in the case of crystalline polymeric materials such as HDPE occurs about 5–10° C. above the temperature at which the polymer transitions into a glassy or fusible state. If the rigid structure is unable to adhere and fuse to the heat molded thermoplastic used, it would be feasible to pre-treat the rigid thermoplastic structure with an application of auxiliary heat, or the dispensing application of a molten low density PE with a relatively high melt index and lower density, which would act as a fusing media therebetween.

Referring now to FIGS. 16A–G, an alternative processing sequence producing triple sheet article 400 (see FIG. 11) is shown. This exemplary triple sheet article is substantially equal to the prior triple sheet article 400. The principle difference of interest is that rigidizing structure 27 is encapsulated within an envelope of plastic formed by sheets 25a and 25c during the triple sheet thermoforming procedure demonstrated in the later equivalent FIGS. 10D and F.

Although the positioning of structure 27 may be accomplished by manual, semi-automatic or automatic means as preferred by the practitioner of the triple sheet methodology, and may be constructed of wood, metal or any other material as may also be preferred and intended to impart strength and improved physical properties, it will be understood that such a sequence has problems.

Figure 16:
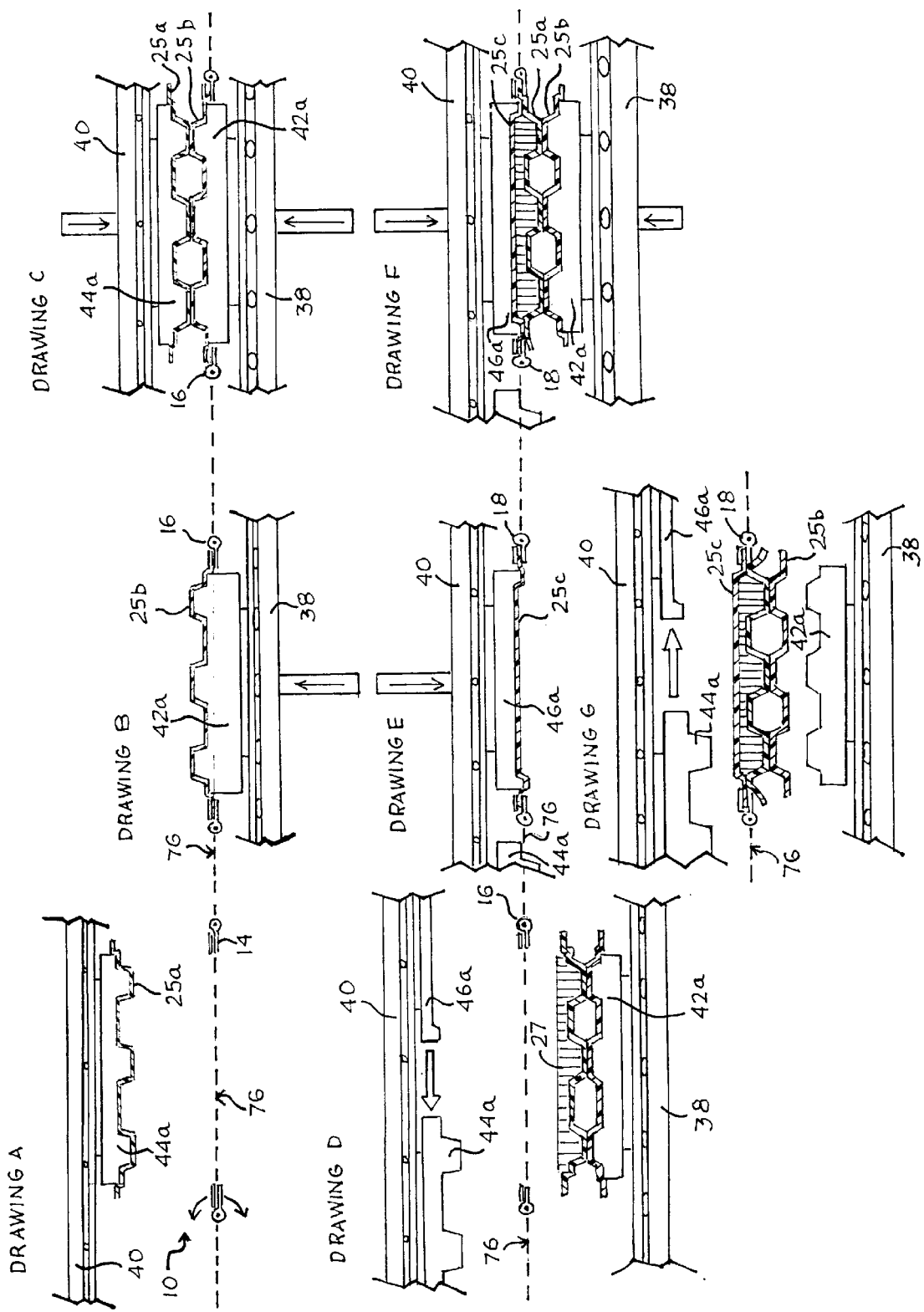
FIG. 16 is a schematic side elevation view showing another method sequence of the present invention.
Figure 17:
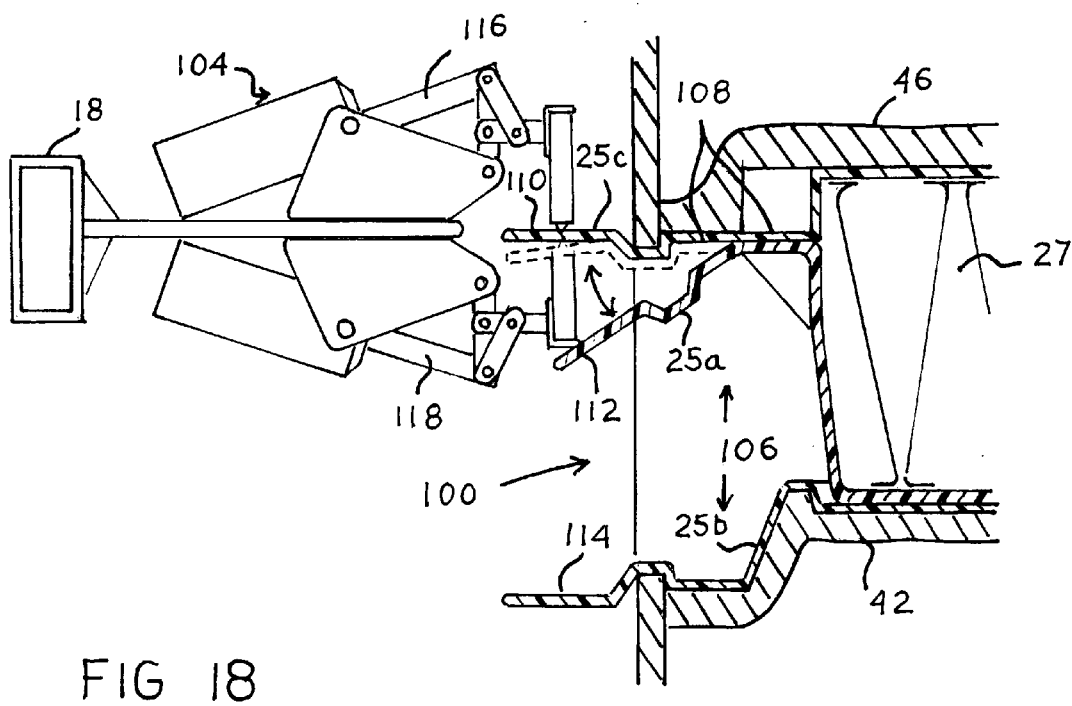
FIG. 17 is an enlarged partial view of FIG. 16F.

In FIG. 17, an exploded sectional view of FIG. 16F is illustrated to provide fuller detail of the proposed embodiment of a triple sheet article being selectively fused with the apparatus of the present invention to disadvantage. When triple sheets 25a, 25b and 25c are compressed between upper mold 46 and lower mold 42, it is understood that some advantageous compression resistance is provided by preferred structure 27, a thermoplastic hybrid honeycomb member expanded from a single sheet of the same material (s) used to mold the triple sheet article. However, unsupported space 106 is located about the general region 100 of article 400 when sheet of thermoplastic 25c is in the closed clamp frames 104 and the compressed molds 46 and 42. Two problems are evident in FIG. 17.

Selective fusing points 108 between sheet 25c and sheet 25a (shown in phantom) are unsupported such that compression applied to cause the two otherwise suitably heated thermoplastics to create a thermobond will likely fail under robust operating field conditions. Secondly, the length and attitude of run off portions 110 of sheet 25c, portions 112 of sheet 25a and portions 114 of sheet 25b, are such that they interfere with the extending and retracting movement of the sheets upon the molds upon the platen as well as the opening and closing operations of the opposed double acting clamp cylinders 116 and 118. Therefore, to overcome these two problems of the proposed sequence of the proposed triple sheet method represented in FIG. 16, an auxiliary compression apparatus is contemplated.

Figure 18:
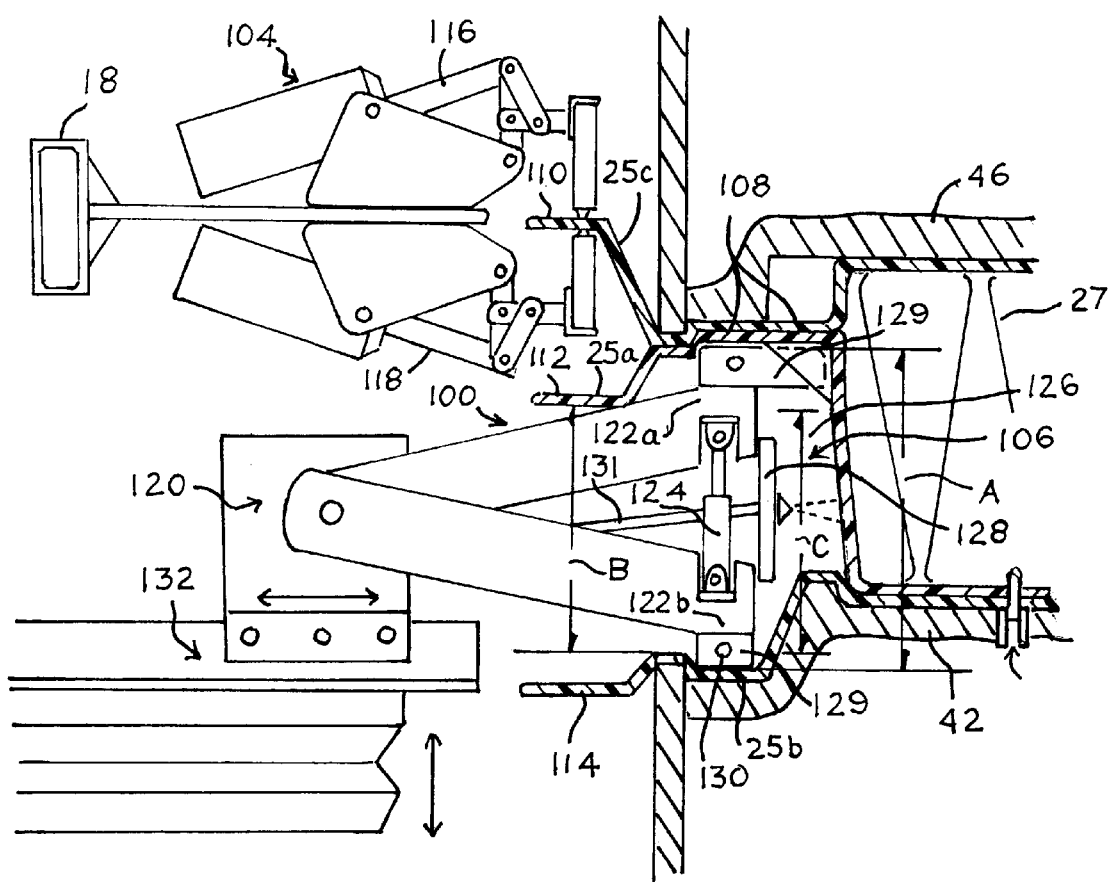
FIG. 18 is an enlarged partial view of another version of FIG. 17F.

As seen in FIG. 18, an exploded sectional view of an alternative arrangement to the one shown in FIG. 17 is disclosed. Run off portions 110, 112 and 114 are directed away from the extending and retracting movement of the sheets upon the molds upon the platens. Run off portions 110, 112, and 114 are further directed away from the pivoting action of the clamp cylinders 116 and 118. Compression assist tooling 120 is laterally shifted into unsupported space 106 to aid in the selected fusion through heat and pressure of sheets 25c and 25a. In one preferred embodiment of the presently invented methods and apparatus, compression assist tooling 120 comprises expanding members 122a and 122b that are expanded by mechanical pneumatic apparatus 124 during the procedure characterized by FIG. 16F. Also shown are dimensions A, B, and C, wherein dimension A equals the expanded dimension of members 122a and 122b, dimension B equals the vertical distance between run off portions 112 and 114 of sheets 25a and 25b, and dimension C equals the compressed dimension of members 122a and 122b in the extend and retract mode. As will be understood, to aide in the triple sheet thermoforming of the proposed article 400a, region 100 is engineered (or optionally the molds are thrust further through the sheet line) so that dimension C is equal to or less than dimension B, such that the compression assist tooling 120 can be laterally inserted into area 106 without interference. In cooperation with the compression of upper platen 40 and mold 46 against lower platen 38 and mold 42, expanding members 122a and 122b are opened to resist the compressive action of the triple sheet method. Also optionally incorporated into compression assist tooling 120, is means 131 for introducing temperature regulated compressed air or vaporized water into the open space 126 formed between sheets 25a and 25b. Seal plate 128 operates to preserve the seal provided with the expansion of members 122a and 122b. Optionally, compressed air may be introduced into space 126 through a hole pierced through sheet 25b by the operation of mold 42 in known manner. Optionally included with expanding members 122a and 122b are heated elements 129 and RTD sensors 130 for precise temperature control. The heated elements 129 deliver heat to areas 108 to be selectively fused.

Figure 19A:
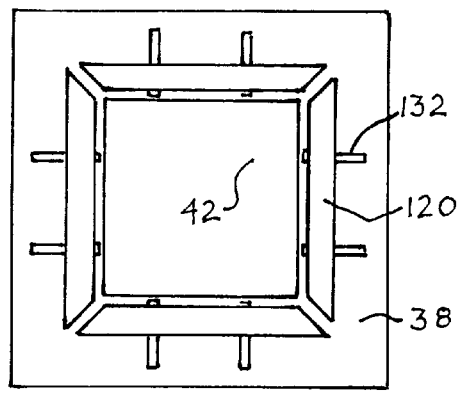
FIGS. 19A and B are plan views of the apparatus disclosed in FIG. 18.
Figure 19B:
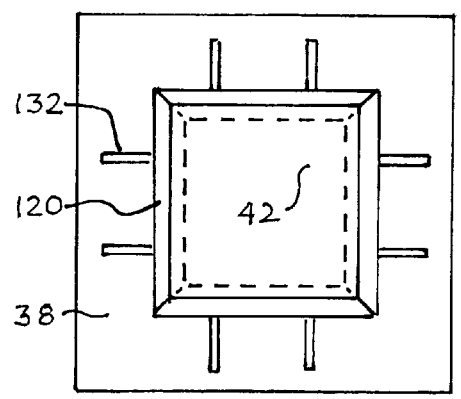

Also understood, but not shown in FIG. 18, are slide assemblies 132 which in the extract and extend manners portrayed in FIG. 19 operate to laterally shift compression assist tooling 120 into and away from space 106 during the production sequence represented in FIG. 16F. It is also understood that the lateral movement of compression assist tooling 120 upon slide assemblies 132 is greater than the width of the lateral dimensions in the horizontal direction of double acting clamp cylinders 116 and 118 fastened to frames 18 of the circular wheel 12 (see FIG. 1). This arrangement is preferred to prevent interference from double acting clamp cylinders 116 and 118 upon the slide assemblies 132 and compression assist tooling 120. In practice, this may mean that compression assist tooling 120 will have to slide laterally 9+ inches away from mold 42a to prevent tooling 120 from interfering with second frame 16 when sheet 25b is thermoformed over lower mold 42a in the contemplated production sequence of FIG. 16. Accordingly, it will be appreciated that the auxiliary compression assist apparatus as disclosed may be preferred to facilitate certain embodiments available to practitioners of the advanced art of triple sheet thermoforming methods, apparatus and articles.

Figure 20:
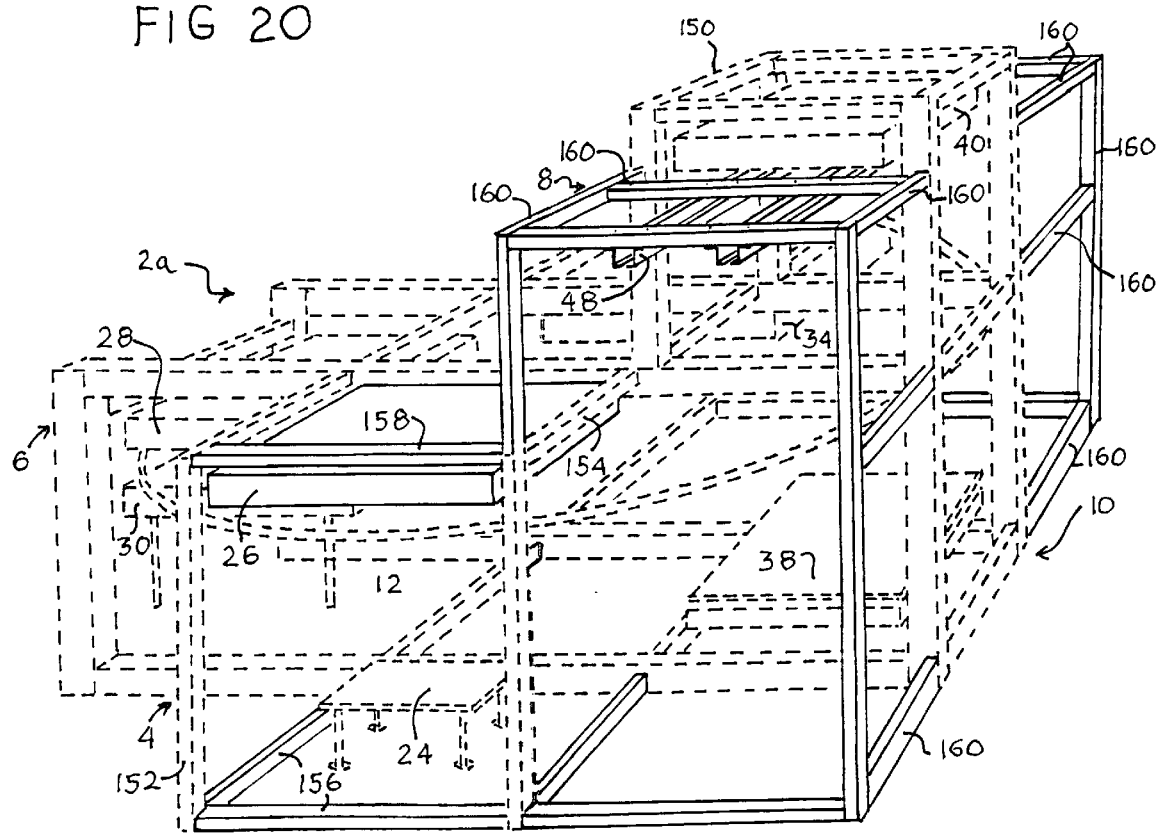
FIG. 20 is a perspective view showing the apparatus of the present invention.

The triple sheet apparatus proposed may be added to virtually any existing twin sheet thermoforming machine developed in the conventional Geneva rotary machine style in which wheel 12 is repeatedly indexed in +/−90° increments after a predetermined dwell time. The triple sheet apparatus included in a proposed embodiment of a triple sheet apparatus retro-fit kit is listed hereunder, and includes the following elements, as shown in FIGS. 1, 18 and 20: an upper load/unload station preheat oven 26 and supporting frame members 156 and 158; co-engaging, pivotally opposed pin bars mounted to co-acting solenoid operated cylinders 116 and 118 and four subclamp-frame assemblies 14a, 16a, 18a and 20a; a laterally movable slide assembly 48 adapted for mechanical cooperation with platen 40 and form station supporting frame members; all associated pneumatic, hydraulic and electric motors, drives, switches, relays and other mechanical or electromechanical devices and instruments; and, all digitally controllable processors plus programming suitable for the practice, methods and apparatus of the triple sheet thermoforming invention. FIG. 20 is provided to illustrate the triple sheet apparatus and elements thereof, that are added to a conventional four station rotary twin sheet thermoformer of the type referenced above.

As can be further seen in FIG. 20, existing twin sheet thermoformer 2a is shown in phantom. In particular, to simplify the drawing, only thermoformer superstructure 150, ovens 28, 30, 32 and 34, upper and lower platens 40 and 38, load table 24, and wheel 12 are shown in phantom. Together, these elements define first unload/load station 4, second pre-heat oven station 6, third final heat oven station 8 and fourth forming station 10. The apparatus added to convert the amenable twin sheet thermoformer 2a to a triple sheet thermoformer 2b is drawn in solid lines.

In particular, the original superstructure 150 extending to support wheel 12 and to define the unload/load station 4 includes two pillars 152 and two beams 154 in the twin sheet methodology. The columns and beams 152 and 154 are reinforced by floor members 156 about the base of the superstructure 150 and by cross member(s) 158 such that the members 156 and 158 are operable with elements 152 and 154 of superstructure 150 to carry the load of oven 26 in a position vertically aligned in spaced parallel relation above fully indexed clamp frames (not shown) supported upon wheel 12. A plurality of structural members 160 are also added in the triple sheet methodology to superstructure 150 of the twin sheet apparatus about form station 10. Structural members 160 generally extend to the left and right of elements of superstructure 150 defining form station 10. Triple sheet structural members 160 are adapted to support the combined loads of elements of the laterally movable mold slide apparatus 48 and the thermoforming molds (not shown) attached thereto. As will be appreciated, slide apparatus 48 operates to shift first mold 44 laterally into position in form station 10 to be engaged by the vertically movable platen 40 to thermoform a first sheet of thermoplastic over mold 44, and then to shift second mold 46 laterally into position in form station 10 to be engaged by the vertically movable platen 40 to thermoform a third sheet of thermoplastic over second mold 46. Thus, slide apparatus 48 reciprocates two or more molds back and forth into and out of form station 10 in phase with the triple sheet thermoforming methodology. It is also understood that further variations of the apparatus relating to mold slide 48 exist. For example, the slide structure may be contained within the vertical margin defined by the borders of the vertically moveable platen, such that approximately ⅓ or less of the platen is developed to thermoform triple sheet articles (This option is shown in FIG. 1). In such cases, structural members 160 would not be contemplated as part of the triple sheet apparatus retrofit kit. Also, it is understood that slide apparatus 48 may be movable according to, but not limited to, hydraulic or pneumatic rams, mechanical drives or electric motor assemblies as are well know and as may be preferred by the practitioner of triple sheet methods and apparatus.

Figure 21A:
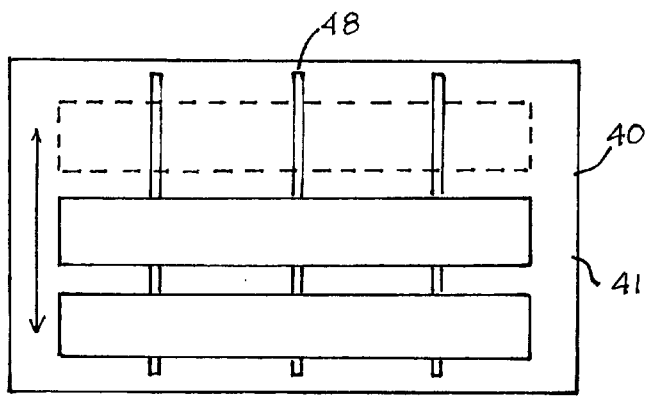
FIGS. 21A and B are plan views of two embodiments of a slide apparatus inside a platen.
Figure 21B:
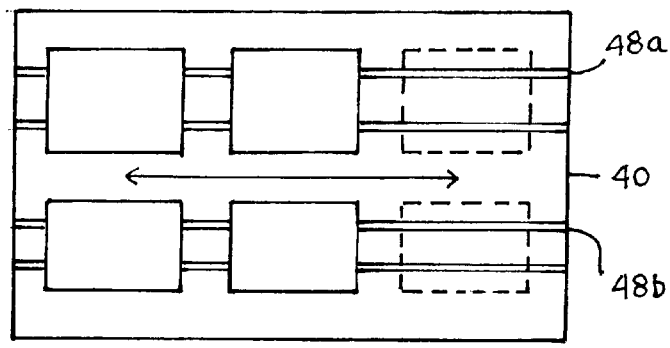
Figure 22A:
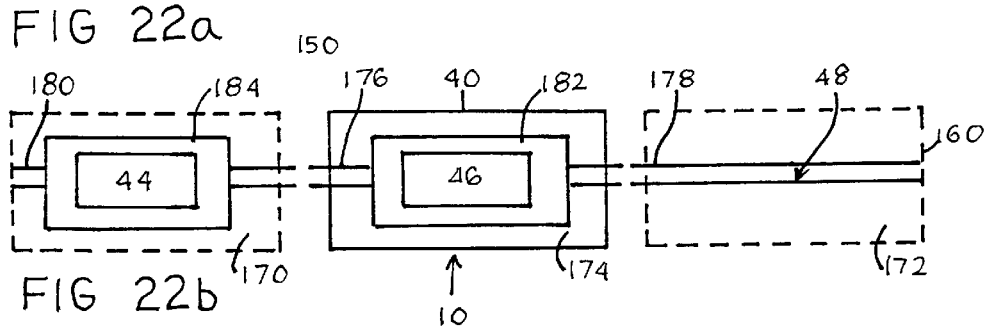
FIGS. 22A and B are plan views showing the relative movement of the slide apparatus.
Figure 22B:
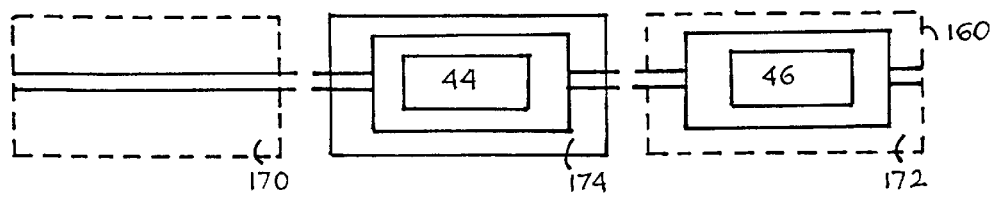

It is further recognized that thermoforming machinery of the type referred to above comes in many sizes, in respect to the platens. As may be seen in FIGS. 21A and B, existing machine platens characteristic of the heavy gauge sector of the thermoforming industry range up to 180 inches in width (transverse direction of sheet extrusion) and 360 inches in length (extrusion direction). Accordingly, it may be understood that laterally moving slide structures can be arranged to slide successive molds contemplated in the triple sheet methodology in the transverse (see FIG. 21A) or extrusion (see FIG. 21B) directions of a platen. It may also be understood that if the existing platen is sufficiently large, two or more articles, such as dumpster lids, may be thermoformed simultaneously with co-acting slide structures 48a and 48b. Referring to FIGS. 22a and b, it may be advantageous to attach upon the superstructure enclosing the form station of any such thermoforming machine certain out riggings 160 suspending outer elements of a slide structure operable with inner elements of a slide structure to facilitate the lateral shifting of two or more molds into or away from a mold engaging means mounted upon a vertically movable platen. Indeed, this arrangement is preferred in triple sheet thermoforming machines dedicated to the constant long term production of articles of a uniform character, such as reinforced triple sheet article racking pallet 402. As may be appreciated in reference to FIG. 21, wherein the production of long articles, such as a kayak is proposed, the limiting factor in the size of a product that can be made according to the methods of triple sheet thermoforming is determined by the size of the twin sheet machine platens.

Also included in the triple sheet apparatus retro-fit kit proposed to convert a twin sheet machine to the triple sheet methodology are new clamp frame sub-assemblies 104, as shown in FIG. 18, comprising opposed double acting clamp cylinders 116 and 118 to which are attached opposed pin bars 117 and 119. As is described in some detail above, clamp frame sub-assemblies 104 are distinguished by their ability to pivot out of way of the upward path traveled by sheets 25a upon molds 44 and 44a attached to upper platen 40 as proposed in one or more of the preferred embodiments of the present invention.

In further elaboration of slide structure 48 and its basic constituent parts, it will be understood in conjunction with FIGS. 20, 21A, 22A and 22B, that slide structure 48 is characterized by three zones including zone 170 occupying a position between the load/unload station 4 and form station 10, zone 172 occupying a position between third oven station 8 and form station 10 and zone 174, co-existing with upper platen 40 within form station 10. Zones 170 and 172 are supported by frame elements 160 that are attached to superstructure 150. Within zones 170, 172 and 174 is track 179 comprising track sections 180, 178 and 176, respectively. Track section 176 is attached to upper platen 40 which travels vertically from open to closed positions. Mounted upon the track 179 are two moving platforms 182 and 184 which travel laterally into and out of the form station 10. Upon said platforms of the present embodiment are thermoforming molds 44 and 46. It may also understood that slide structure 48 and frame elements 160 may be re-orientated from the extrusion direction of the platen to the traverse direction of the platen as would be intended for other article(s) to be thermoformed according to the triple sheet methodology. Further, it would be understood that the constituent parts of slide apparatus 48 could be contained entirely upon the working surface of upper platen 40 and within border 41 defined by the vertical path traveled by the platen 40 traveling from an open position to a closed position.

Accordingly, it will be appreciated that in synchronization with the triple sheet methodology that slide apparatus 48 is operable to move platform 182 and mold 46 into form station 10 to be releasably engaged by traveling platen 40 to thermoform a first sheet and to move platform 184 and mold 44 into form station 10 to be releasably engaged by traveling platen 40 to thermoform a second sheet. The reciprocating action performed by slide apparatus 48 may be provided by means including hydraulic or pneumatic actuation, electro-mechanical apparatus, or a combination thereof, as is preferred by the practitioner of the triple sheet methodology or the machine builder supplying the triple sheet apparatus.

In another embodiment of triple sheet thermoforming machine 2a, wherein the triple sheet elements 26, 156 and 158 are added to first load/unload station 4, first upper oven 26 includes means to adjust the vertical position of oven 26 above and relative to wheel 12 carrying articles forward from fourth form station 10, which is to be unloaded. As will be appreciated, articles thermoformed against molding surfaces that extend well above the vertical plane defined by wheel 12 will crash into sheet metal 35 enclosing first upper oven 26. Accordingly, this potential problem is addressed with the addition of controls that instruct the oven to travel vertically from a closed position to an open position before wheel 12 is indexed forward carrying an article to load/unload station 4. The means developed to achieve this function would be substantially equivalent to the means of known character which allow lower ovens 30 and 34 to travel from an closed to an open position a fixed distance from the thermoplastic sheet in relation to its catenary displacement.

Figure 23:
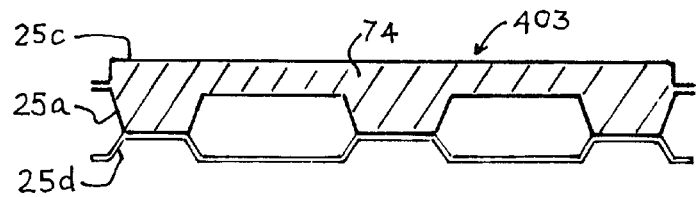
FIG. 23 is a side elevation view of article embodiments requiring control specific to the heat absorption characteristics of triple sheet articles.

Referring now to FIG. 23, alternatives to triple sheet article 402 are proposed and described. Triple sheet article 403, formed in the manner shown in FIG. 10, is comprised of sheets 25a, 25c and 25d. As can be seen, sheet 25d is thicker in cross-section than sheets 25a and 25c. Thicker sheet 25d is proposed to increase the weight to strength ratio of proposed triple sheet article 403. It will be understood that any of the three sheets 25a, 25c or 25d can be provided with a thicker or thinner thickness in cross-section, depending upon the physical requirements of the triple sheet article proposed. It is further understood that select heat profile algorithms suitable for applying heat to the preferred sheet in the cycle times proposed in the triple sheet methodology are a feature characteristic of the present invention.

Sheet 25d, in addition to being thicker, can also be constructed out of a composite of thermoplastic materials, or with fillers such as glass or talc, or with resins that have narrower molecular weight distribution or higher molecular weights, such that sheet 25d has improved physical properties (impact resistance, hardness, flexural stiffness, dimensional stability, etc.), or reduced cost. Thus it maybe seen that the triple sheet methodology and apparatus, together with the microprocessor programmable and menu-driven control capabilities preferred provide a wider degree of flexibility in process control than is characteristic of conventional twin sheet thermoforming machines. Preferably, the heat control of the triple sheet methodology will be in accordance with algorithms which adjusts heat profiles within the five ovens in response to sensor inputs concerning air temperature, component temperatures and the sagging catenary disposition of the successive thermoplastic sheets engaged in the clamp frames. The control algorithms may be over-ridden by manual adjustment by a skilled operator as required, or again, preferably controlled by adaptive algorithms which increase or decrease heater output in accordance with the forming, fusing and cooling sequences and dwell times of the preferred triple sheet methodology.

It is to be understood that the drawings and descriptive matter are in all cases to be interpreted as merely illustrative of the principles, methods and apparatus of the invention, rather than as limiting the same in any way, since it is contemplated that various changes may be made in various elements to achieve like results without departing from the spirit of the invention or the scope of the appended claims.

I claim:

1. A method for thermoforming a single article from three heat deformable thermoplastic sheets, the method comprising:

releasably clamping three thermoplastic sheets to a frame;

moving the three thermoplastic sheets on the frame through at least three ovens and heating the three thermoplastic sheets to a heat deformable temperature;

moving the three heated sheets successively to a forming station on the frame;

supporting in spaced apart overlying relation a first platen and a second platen on the forming station, and causing the platens to travel in opposed directions between open and closed positions;

selectively positioning three molds on the first and second platens;

selectively slidably moving a second one of the molds and a third one of the molds into and out of position on the second platen;

moving the first and second platens in succession between the open and closed position to displace the three molds and to apply pressure to the three heated thermoplastic sheets in order to mold the sheets in a preselected configuration;

moving one platen to compress a first one of the molded sheets against a second one of the molded sheets retained by the second platen in order to fuse together the two molded sheets to form a twin sheet molded article; and moving the platen retaining the twin sheet molded article into compression with the other platen retaining a third one of the molded sheets on the third mold in order to fuse together the twin sheet molded article and the third molded sheet to form a triple sheet molded article.

2. The method of claim 1 wherein the triple sheet molded article is a pallet.

3. A method of making an article from at least first, second and third thermoplastic sheets on a machine having at least first, second and third molds, the method comprising:

(a) heating the first thermoplastic sheet;

(b) conforming the first sheet to the first mold;

(c) heating the second thermoplastic sheet;

(d) conforming the second sheet to the second mold;

(e) aligning the first mold with the second mold so the first and second sheets face each other;

(f) moving at least one of the first and second molds toward the other;

(g) joining together sections of the first and second sheets to form a sheet subassembly;

(h) heating the third thermoplastic sheet;

(i) conforming the third sheet to the third mold;

(j) aligning the third mold with the sheet subassembly;

(k) moving at least one of the third mold and the sheet subassembly toward the other; and (l) joining together sections of the sheet subassembly and the third sheet thereby forming the article.

4. The method of claim 3 wherein the sheets are joined together with the assistance of heat.

5. The method of claim 4 wherein the sheets are joined together only by heated fusing of desired portions of the thermoplastic sheets.

6. The method of claim 3 further comprising applying vacuum pressure to the previously heated sheets to conform the sheets in their respective molds.

7. The method of claim 3 further comprising nesting together previously formed legs projecting from each of the first, second and third sheets, with gaps being present between adjacent portions of the fully nested legs even after the sheets are joined together.

8. The method of claim 3 further comprising vertically moving both the first and second molds toward each other and subsequently vertically moving both the second and third molds toward each other.

9. The method of claim 3 wherein at least the first and third molds are alternately shuttled to a position aligned with the second mold.

10. The method of claim 3 further comprising creating a completely recyclable and entirely thermoplastic pallet having structural projecting legs and ribs between the joined adjacent sheets.

11. The method of claim 3 further comprising creating separated openings between joined inner margins in at least two of the joined sheets.

12. The method of claim 3 further comprising rotating a wheel retaining at least one of the molds, such that at least one of the sheets is moved between multiple ovens.

13. A method of making a multisheet article with a first mold for a first sheet, a second mold for a second sheet, a third mold for a third sheet, and an abutment, the method comprising:

(a) heating and forming the first sheet with the assistance of the first mold;

(b) heating and forming the second sheet with the assistance of the second mold;

(c) heating and forming the third sheet with the assistance of the third mold;

(d) inserting the abutment into a gap between spaced apart peripheral margins of the first and second sheets;

(e) joining together peripheral margins of the first and second sheets;

(f) compressing together peripheral margins of the second and third sheets between the third mold and the abutment;

(g) joining together the peripheral margins of the second and third sheets thereby forming the multisheet article; and (h) removing the abutment from between the first and third molds after step (g).

14. The method of claim 13 further comprising heating the peripheral margins of the second and third sheets through the third mold and through the abutment.

15. The method of claim 13 further comprising applying vacuum pressure to conform the sheets to their respective molds.

16. The method of claim 13 further comprising sensing the temperature during sheet joining by removably positioning at least one sensor adjacent to portions of the sheets to be fused together.

17. The method of claim 13 further comprising introducing compressed air between portions of the sheets during joining.

18. The method of claim 13 further comprising introducing compressed vaporized water between portions of the sheets during joining.

* * * * *